(12) United States Patent
Hays et al.

(10) Patent No.: US 12,355,079 B2
(45) Date of Patent: Jul. 8, 2025

(54) LITHIUM ION CELLS WITH SILICON BASED ACTIVE MATERIALS AND NEGATIVE ELECTRODES WITH WATER-BASED BINDERS HAVING GOOD ADHESION AND COHESION

(71) Applicant: Zenlabs Energy, Inc., Fremont, CA (US)

(72) Inventors: Kevin Hays, Fremont, CA (US); Subramanian Venkatachalam, Pleasanton, CA (US); Herman A. Lopez, Sunnyvale, CA (US)

(73) Assignee: Ionblox, Inc., Fremont, CA (US)

( * ) Notice: Subject to any disclaimer, the term of this patent is extended or adjusted under 35 U.S.C. 154(b) by 419 days.

(21) Appl. No.: 16/920,047

(22) Filed: Jul. 2, 2020

(65) Prior Publication Data
US 2022/0006090 A1 Jan. 6, 2022

(51) Int. Cl.
*H01M 4/62* (2006.01)
*H01M 4/02* (2006.01)
*H01M 4/1315* (2010.01)
*H01M 4/48* (2010.01)
*H01M 4/587* (2010.01)
*H01M 10/0525* (2010.01)

(52) U.S. Cl.
CPC ......... *H01M 4/622* (2013.01); *H01M 4/1315* (2013.01); *H01M 4/48* (2013.01); *H01M 4/587* (2013.01); *H01M 10/0525* (2013.01); *H01M 2004/027* (2013.01)

(58) Field of Classification Search
CPC .......... Y02E 60/10; Y02P 70/50; Y02T 10/70; H01M 4/621; H01M 4/622; H01M 4/386; H01M 4/1315; H01M 4/48; H01M 4/587; H01M 4/364; H01M 4/483; H01M 4/505; H01M 4/525; H01M 4/625; H01M 10/0525; H01M 2004/027; H01M 2300/0025; C08L 33/26
See application file for complete search history.

(56) References Cited

U.S. PATENT DOCUMENTS

| | | |
|---|---|---|
| 4,857,423 A | 8/1989 | Abraham et al. |
| 5,192,629 A | 3/1993 | Guyomard et al. |
| 5,395,711 A | 3/1995 | Tahara et al. |

(Continued)

FOREIGN PATENT DOCUMENTS

| | | |
|---|---|---|
| CN | 101587970 A | 11/2009 |
| CN | 105580173 A | 5/2016 |

(Continued)

OTHER PUBLICATIONS

Machine translation of KR 20170076592 A (Year: 2017).*

(Continued)

*Primary Examiner* — Kiran Quraishi Akhtar
(74) *Attorney, Agent, or Firm* — Christensen, Fonder, Dardi PLLC; Peter S. Dardi; Elizabeth A. Gallo

(57) ABSTRACT

Polymer binders for negative electrodes with silicon based active materials are described based on poly(acrylamide-co-acrylate salts). Lithium ion batteries incorporating electrodes formed with the binders achieve longer cycling with suitable performance. Mechanical properties associated with each of the moieties of the copolymers are studied to guide polymer selection.

23 Claims, 7 Drawing Sheets

(56) References Cited

U.S. PATENT DOCUMENTS

| | | |
|---|---|---|
| 5,422,203 A | 6/1995 | Guyomard et al. |
| 5,484,669 A | 1/1996 | Okuno et al. |
| 5,521,027 A | 5/1996 | Okuno et al. |
| 5,743,921 A | 4/1998 | Nazri et al. |
| RE35,818 E | 6/1998 | Tahara et al. |
| 5,830,600 A | 11/1998 | Narang et al. |
| 5,908,717 A | 6/1999 | Pendalwar et al. |
| 5,922,494 A | 7/1999 | Barker et al. |
| 5,994,000 A | 11/1999 | Ein-Ein et al. |
| 5,998,065 A | 12/1999 | Tsutsumi et al. |
| 6,153,338 A | 11/2000 | Gan et al. |
| 6,235,427 B1 | 5/2001 | Idota et al. |
| 6,291,107 B1 | 9/2001 | Shimizu et al. |
| 6,346,351 B1 | 2/2002 | Yde-Andersen et al. |
| 6,444,370 B2 | 9/2002 | Barker et al. |
| 6,455,200 B1 | 9/2002 | Prakash et al. |
| 6,482,549 B2 | 11/2002 | Yoshimura et al. |
| 6,492,064 B1 | 12/2002 | Smart et al. |
| 6,506,524 B1 | 1/2003 | McMillan et al. |
| 6,682,849 B2 | 1/2004 | Narang et al. |
| 6,692,874 B2 | 2/2004 | Kim et al. |
| 6,746,804 B2 | 6/2004 | Gan et al. |
| 6,783,896 B2 | 8/2004 | Tsujioka et al. |
| 6,787,267 B2 | 9/2004 | Tsujioka et al. |
| 6,787,268 B2 | 9/2004 | Koike et al. |
| 6,787,269 B2 | 9/2004 | Sekino et al. |
| 6,855,458 B1 | 2/2005 | Kim et al |
| 6,884,546 B1 | 4/2005 | Fujita et al. |
| 6,942,949 B2 | 9/2005 | Besenhard et al. |
| 6,958,198 B2 | 10/2005 | Iwamoto et al. |
| 7,008,722 B2 | 3/2006 | Huang |
| 7,022,145 B2 | 4/2006 | Kim et al. |
| 7,026,074 B2 | 4/2006 | Chen et al. |
| 7,074,523 B2 | 7/2006 | Arai et al. |
| 7,172,834 B1 | 2/2007 | Jow et al. |
| 7,214,446 B1 | 5/2007 | Bi et al. |
| 7,226,704 B2 | 6/2007 | Panitz et al. |
| 7,229,717 B2 | 6/2007 | Yamaguchi et al. |
| 7,235,334 B2 | 6/2007 | Kim et al. |
| 7,255,965 B2 | 8/2007 | Xu et al. |
| 7,311,993 B2 | 12/2007 | Ivanov et al. |
| 7,348,103 B2 | 3/2008 | Ivanov et al. |
| 7,378,190 B2 | 5/2008 | Yanai et al. |
| 7,416,813 B2 | 8/2008 | Fujihara et al. |
| 7,432,015 B2 | 10/2008 | Jeong et al. |
| 7,452,632 B2 | 11/2008 | Lee et al. |
| 7,455,933 B2 | 11/2008 | Shimura et al. |
| 7,465,517 B2 | 12/2008 | Ivanov et al. |
| 7,491,471 B2 | 2/2009 | Yamaguchi et al. |
| 7,507,503 B2 | 3/2009 | Amine et al. |
| 7,510,803 B2 | 3/2009 | Adachi et al. |
| 7,700,221 B2 | 4/2010 | Yeo |
| 7,754,389 B2 | 7/2010 | Yamaguchi et al. |
| 7,794,511 B2 | 9/2010 | Wensley et al. |
| 7,923,150 B2 | 4/2011 | Yamamota et al. |
| 8,187,752 B2 | 5/2012 | Buckley et al. |
| 8,227,974 B2 | 10/2012 | Kumar et al. |
| 8,277,969 B2 | 10/2012 | Kumar et al. |
| 8,389,160 B2 | 3/2013 | Venkatachalam et al. |
| 8,394,534 B2 | 3/2013 | Lopez et al. |
| 8,399,136 B2 | 3/2013 | Ohashi et al. |
| 8,465,873 B2 | 6/2013 | Lopez et al. |
| 8,535,832 B2 | 9/2013 | Karthikeyan et al. |
| 8,663,849 B2 | 3/2014 | Ventakachalam et al. |
| 8,765,306 B2 | 7/2014 | Amiruddin et al. |
| 8,928,286 B2 | 1/2015 | Amiruddin et al. |
| 8,993,177 B2 | 3/2015 | Amiruddin et al. |
| 9,083,062 B2 | 7/2015 | Kumar et al. |
| 9,139,441 B2 | 9/2015 | Anguchamy et al. |
| 9,142,858 B2 | 9/2015 | Nakanishi et al. |
| 9,159,990 B2 | 10/2015 | Amiruddin et al. |
| 9,166,222 B2 | 10/2015 | Amiruddin et al. |
| 9,190,694 B2 | 11/2015 | Lopez et al. |
| 9,552,901 B2 | 1/2017 | Amiurddin et al. |
| 9,601,228 B2 | 3/2017 | Deng et al. |
| 9,780,358 B2 | 10/2017 | Masarapu et al. |
| 9,843,041 B2 | 12/2017 | Lopez et al. |
| 10,218,033 B1 | 2/2019 | Bhardwaj et al. |
| 10,290,871 B2 | 5/2019 | Masarapu et al. |
| 10,862,126 B2 | 12/2020 | Kang et al. |
| 11,094,925 B2 | 8/2021 | Venkatachalam et al. |
| 2002/0037458 A1 | 3/2002 | Yamaguchi et al. |
| 2002/0084445 A1 | 7/2002 | Garbe |
| 2002/0102466 A1 | 8/2002 | Hwang et al. |
| 2003/0157407 A1 | 8/2003 | Kosuzu et al. |
| 2003/0165733 A1 | 9/2003 | Takehara et al. |
| 2004/0023117 A1 | 2/2004 | Imachi et al. |
| 2004/0033419 A1 | 2/2004 | Funabiki |
| 2004/0072072 A1 | 4/2004 | Suzuki et al. |
| 2004/0151951 A1 | 8/2004 | Hyung et al. |
| 2004/0214085 A1 | 10/2004 | Sheem et al. |
| 2004/0214092 A1 | 10/2004 | Noh et al. |
| 2005/0008941 A1 | 1/2005 | Kim et al. |
| 2005/0019670 A1 | 1/2005 | Amine et al. |
| 2005/0031963 A1 | 2/2005 | Im et al. |
| 2005/0042520 A1 | 2/2005 | Roh et al. |
| 2005/0233207 A1 | 10/2005 | Kim |
| 2005/0233213 A1 | 10/2005 | Lee et al. |
| 2006/0040182 A1 | 2/2006 | Kawakami et al. |
| 2006/0115734 A1 | 6/2006 | Shihara et al. |
| 2006/0172201 A1 | 8/2006 | Yasukawa et al. |
| 2006/0194119 A1 | 8/2006 | Son et al. |
| 2006/0228626 A1 | 10/2006 | Kawashima et al. |
| 2006/0269834 A1 | 11/2006 | West et al. |
| 2006/0281012 A1 | 12/2006 | Ugawa et al. |
| 2006/0286459 A1 | 12/2006 | Zhao et al. |
| 2007/0003836 A1 | 1/2007 | Suzuki et al. |
| 2007/0148549 A1 | 6/2007 | Kobayashi et al. |
| 2007/0287071 A1 | 12/2007 | Chiga et al. |
| 2008/0008933 A1 | 1/2008 | Lampe-Onnerud |
| 2008/0026297 A1 | 1/2008 | Chen et al. |
| 2008/0063945 A1 | 3/2008 | Ivanov et al. |
| 2008/0131772 A1 | 6/2008 | Jambunathan et al. |
| 2008/0131783 A1 | 6/2008 | Choi et al. |
| 2008/0193831 A1 | 8/2008 | Mah et al. |
| 2008/0226988 A1 | 9/2008 | Minami et al. |
| 2008/0254353 A1 | 10/2008 | Takezawa |
| 2008/0261115 A1 | 10/2008 | Saito et al. |
| 2009/0023065 A1 | 1/2009 | Hwang et al. |
| 2009/0092900 A1 | 4/2009 | Obana et al. |
| 2009/0111028 A1 | 4/2009 | Lee et al. |
| 2009/0117466 A1 | 5/2009 | Zhamu et al. |
| 2009/0142670 A1 | 6/2009 | Wang et al. |
| 2009/0214952 A1 | 8/2009 | Wakita et al. |
| 2009/0233178 A1 | 9/2009 | Saidi et al. |
| 2009/0239151 A1 | 9/2009 | Nakanishi et al. |
| 2009/0253042 A1 | 10/2009 | Sun et al. |
| 2009/0253046 A1 | 10/2009 | Smart et al. |
| 2009/0263721 A1 | 10/2009 | Haruna et al. |
| 2009/0297937 A1 | 12/2009 | Lampe-Onnerud et al. |
| 2009/0317721 A1 | 12/2009 | Shirane et al. |
| 2009/0317722 A1 | 12/2009 | Watanabe |
| 2010/0035147 A1 | 2/2010 | Kotato et al. |
| 2010/0086854 A1 | 4/2010 | Kumar et al. |
| 2010/0119942 A1 | 5/2010 | Kumar |
| 2010/0120179 A1 | 5/2010 | Zhamu et al. |
| 2011/0017528 A1 | 1/2011 | Kumar et al. |
| 2011/0052981 A1 | 3/2011 | Lopez et al. |
| 2011/0052989 A1 | 3/2011 | Venkatachalam et al. |
| 2011/0111294 A1 | 5/2011 | Lopez et al. |
| 2011/0111298 A1 | 5/2011 | Lopez et al. |
| 2011/0111304 A1 | 5/2011 | Cui et al. |
| 2011/0117446 A1 | 5/2011 | Lucht et al. |
| 2011/0136019 A1 | 6/2011 | Amiruddin et al. |
| 2011/0163274 A1 | 7/2011 | Plee et al. |
| 2011/0165474 A1 | 7/2011 | Im et al. |
| 2011/0171529 A1 | 7/2011 | Kono et al. |
| 2011/0244331 A1 | 10/2011 | Karthikeyan et al. |
| 2012/0045670 A1 | 2/2012 | Stefan et al. |
| 2012/0070741 A1 | 3/2012 | Liu et al. |
| 2012/0070746 A1 | 3/2012 | Mikahylik et al. |
| 2012/0082877 A1 | 4/2012 | Song et al. |
| 2013/0122353 A1 | 5/2013 | Kawasaki et al. |
| 2013/0157147 A1 | 6/2013 | Li et al. |

(56) References Cited

U.S. PATENT DOCUMENTS

| | | | |
|---|---|---|---|
| 2013/0224585 A1 | 8/2013 | Oh et al. | |
| 2013/0295439 A1 | 11/2013 | Masarapu et al. | |
| 2014/0308585 A1* | 10/2014 | Han | C01B 33/18 252/502 |
| 2014/0370387 A1 | 12/2014 | Anguchamy et al. | |
| 2015/0037690 A1 | 2/2015 | Dalavi et al. | |
| 2015/0050535 A1 | 2/2015 | Amiruddin et al. | |
| 2015/0050564 A1 | 2/2015 | Mizuno et al. | |
| 2015/0086873 A1 | 3/2015 | Hotta et al. | |
| 2016/0006021 A1 | 1/2016 | Lopez et al. | |
| 2016/0079591 A1 | 3/2016 | Yang et al. | |
| 2016/0233513 A1 | 8/2016 | Abe et al. | |
| 2017/0194627 A1 | 7/2017 | Deng et al. | |
| 2018/0034039 A1 | 2/2018 | Masarapu et al. | |
| 2018/0034058 A1* | 2/2018 | Suh | H01M 4/587 |
| 2018/0062206 A1 | 3/2018 | Yang et al. | |
| 2018/0309169 A1 | 10/2018 | Yang et al. | |
| 2019/0148773 A1 | 5/2019 | Kim et al. | |
| 2019/0207209 A1 | 7/2019 | Venkatachalam et al. | |
| 2020/0168955 A1 | 5/2020 | Shimanuki et al. | |
| 2020/0411901 A1 | 12/2020 | Dong et al. | |

FOREIGN PATENT DOCUMENTS

| | | | |
|---|---|---|---|
| CN | 107180955 A | 9/2017 | |
| CN | 104584309 B | 10/2017 | |
| CN | 108832125 A | 11/2018 | |
| CN | 108933260 A | 12/2018 | |
| CN | 109119631 A | 1/2019 | |
| CN | 109792083 A | 5/2019 | |
| CN | 111139002 A | 5/2020 | |
| EP | 2079120 A2 | 1/2009 | |
| JP | 09-45373 | 2/1997 | |
| JP | 10-255837 | 9/1998 | |
| JP | 2001-118568 | 4/2001 | |
| JP | 2005-332707 A | 12/2005 | |
| JP | 2007-165111 A | 6/2007 | |
| JP | 2007-250440 A | 9/2007 | |
| JP | 2014203748 A | 10/2014 | |
| JP | 2015079636 A | 4/2015 | |
| JP | 2016-143642 A | 8/2016 | |
| KR | 10-0493960 B1 | 9/2004 | |
| KR | 10-2004-0100058 A | 12/2004 | |
| KR | 10-2008-0082276 A | 9/2008 | |
| KR | 2012-0073603 A | 7/2012 | |
| KR | 10-2017-0076592 A | 7/2017 | |
| KR | 20170076592 A * | 7/2017 | H01M 4/13 |
| WO | 2004-040687 A1 | 5/2004 | |
| WO | 2005-083829 A2 | 9/2005 | |
| WO | 2007-126257 A1 | 11/2007 | |
| WO | 2008-079670 A1 | 7/2008 | |
| WO | 2009-022848 A1 | 2/2009 | |
| WO | 2013-082330 A1 | 6/2013 | |
| WO | 2018-051675 A1 | 3/2018 | |
| WO | 2018212276 A1 | 11/2018 | |
| WO | 2019-065704 A1 | 4/2019 | |

OTHER PUBLICATIONS

Achiha et al., "Electrochemical Behavior of Nonflammable Organo-Fluorine Compunds for Lithium Ion Batteries," Journal of the Electrochemical Society 156(6): A483-A488 (2009).

Arai et al. "Air Product's StabiLife™ Electrolyte Salts for Lithium Ion Batteries," Product Brochure; Air Products and Chemicals, Inc., Allentown, PA (2009).

Chen et al., "Develop & evaluate materials & additives that enhance thermal and overcharge abuse," presentation for Argonne National Laboratory, May 19, 2009.

Choi et al., "Effect of fluoroethylene carbonate additive on interfacial properties of silicon thin-film electrode" Journal of Power Sources 161 (2006) 1254-1259. (Abstract only).

Haselrieder et al., "Measuring the coating adhesion strength of electrodes for lithium-ion batteries", International Journal of Adhesion & Adhesives, vol. 60, p. 1-8, (2008).

Higuchi et al., "Kinetic Aspects of Alkaline Hydrolysis of Poly(acrylamide)," Polymer Journal, vol. 3(3), pp. 370-377, (1972).

Iqbal et al., "Lithium-ion Full Cell with High Energy Density Using Nickel-rich LiNi0.8Co0.1Mn0.1O2 Cathode and SiO—C Composite Anode", International Journal of Minerals, Metallurgy and Materials, vol. 25 No. 12, p. 1473-1481, (Dec. 2018).

Ishikawa et al., "Li-ion Battery Performance with FSI-based Ionic Liquid Electrolyte and Fluorinated Solvent-based Electrolyte" ECS Trans. 33:29-36 (2010) (Abstract).

Klein et al., Preparation and Characterization of Poly(acrylamide-co-acrylic acid), Makromo. Chem. vol. 179, pp. 1895-1904, (1978).

"Kulicke et al., ""Preparation and characterization of a series of poly(acrylamide-co-acrylates) with a copolymer composition between 0 and 96.3mol-% acrylate units with the samedegree and distribution of polymerization,"" Colloid & Polymer Science, vol. 263, pp. 530-540, (1985)."

Kurenkov et al., "Alkaline Hydrolysis of Polyacrylamide," Russian Journal of Applied Chemistry, vol. 74 (4), pp. 543-554, (2001).

Market Insight "Tasks of Korean rechargeable electrolyte industry," Solar & Energy Column published Dec. 27, 2010, http://www.solarenergy.com/eng/info/show.php?c_id=4899 (viewed Jun. 23, 2011).

McMillan et al. "Fluoroethylene carbonate electrolyte and its use in lithium ion batteries with graphite anodes," Journal of Power Sources 81-2: 20-26 (1999) (Abstract).

Naoi et al., "Nonflammable Hydrofluoroether for Lithium-Ion Batteries: Enhanced Rate Capability, Cyclability, and Low-Temperature Performance," J. Electrochem. Soc. 156(4):A272-A276 (2009) (Abstract only).

Plichta et al., "A low-temperature electrolyte for lithium and lithium-ion batteries," Journal of Power Sources, 88: 192-196 (2000).

Schweiger et al., "Optimization of Cycling Behavior of Lithium Ion Cells at 60° C. by Additives for Electrolytes Based on Lithium bis[1,2-oxalato(2-)-O,O'] borate," Int. J. Electrochem. Sci., 3: 427-443 (2008).

Smart et al., "Performance of low temperature electrolytes in experimental and prototype Li-ion cells," 5th International Energy Conversion Engineering Conference, St. Louis, Missouri Jun. 25-27, 2007, published by NASA's Jet Propulsion Laboratory, Pasadena California, 2007 (http://hdl.handle.net/2014/41350).

Song et al., Two-and three-electrode impedance spectroscopy of lithium-ion batteries, Journal of Power Sources, 111:255-267 (2002).

Tech Briefs, "Optimized Carbonate and Ester-Based Li-Ion Electrolytes," published by NASA's Jet Propulsion Laboratory, Pasadena, California (Apr. 1, 2008).

Tech Briefs, "Ester-Based Electrolytes for Low- Temperature Li-Ion Cells," published by NASA's Jet Propulsion Laboratory, Pasadena, California (Dec. 1, 2005).

"Technical Support Package for Optimized Carbonate and Ester-Based Li-Ion Electrolytes," NASA Tech Briefs NPO-44974, published by NASA's Jet Propulsion Laboratory, Pasadena, California (37 pages).

Timcal Graphite & Carbon, A Synopsis of Analytical Procedures, 2008, www.timcal.com.

Yu et al, "Measurement of Young's Modulus of Polyarcylamide Gel bu Digital Holography", OSA: DH, (2011).

International Search Report and Written Opinion from corresponding PCT Application No. PCT/US2021/039936 dated Oct. 27, 2021.

Han et al., "Lithium bis(fluorosulfonyl)imide (LiFSI) as conducting salt for nonaqueous liquid electrolytes for lithium-ion batteries: Physicochemical and electrochemical properties", Journal of Pwer Sources, vol. 195 No. 7, p. 3623-3632, (Apr. 2011). Abstract only.

* cited by examiner

LITHIUM ION CELLS WITH SILICON BASED ACTIVE MATERIALS AND NEGATIVE ELECTRODES WITH WATER-BASED BINDERS HAVING GOOD ADHESION AND COHESION

FEDERALLY SPONSORED RESEARCH AND DEVELOPMENT

This invention was made with government support under U.S. Government Funding Agreement Number: DE-EE0006250 under the United States Advanced Battery Consortium Program Number: 19-2225-ABC awarded by the U.S. Department of Energy. The government has certain rights in the invention.

FIELD OF THE INVENTION

The invention relates to lithium ion cells that have good cycling properties with silicon based negative electrode active materials. The invention further relates to negative electrodes having binders that provide for good cycling properties of silicon-based active materials.

BACKGROUND OF THE INVENTION

Lithium cells are widely used in consumer electronics due to their relatively high energy density. Also, lithium ion cells are increasingly important for vehicle applications for hybrid and electric vehicles. For some current commercial cells, the negative electrode material can be graphite, and the positive electrode materials can comprise lithium cobalt oxide ($LiCoO_2$), lithium manganese oxide ($LiMn_2O_4$), lithium iron phosphate ($LiFePO_4$), lithium nickel oxide ($LiNiO_2$), lithium nickel cobalt oxide ($LiNiCoO_2$), lithium nickel cobalt manganese oxide ($LiNiMnCoO_2$), lithium nickel cobalt aluminum oxide ($LiNiCoAlO_2$) and the like. For negative electrodes, lithium titanate is an alternative to graphite with good cycling properties, but it has a lower energy density. Other alternatives to graphite, such as tin oxide and silicon, have the potential for providing increased energy density. However, some high capacity negative electrode materials have been found to be unsuitable commercially due to high irreversible capacity loss and poor discharge and recharge cycling related to structural changes and anomalously large volume expansions, especially for silicon, that are associated with lithium intercalation/alloying. The structural changes and large volume changes can destroy the structural integrity of the electrode, thereby decreasing the cycling efficiency.

SUMMARY OF THE INVENTION

In a first aspect, the invention pertains to a negative electrode for a lithium ion battery comprising an active material comprising a silicon based active material; nanoscale conductive carbon; and a polymer binder comprising poly (acrylamide-co-acrylate salt) having at least about 5 mole percent of the acrylate salt moiety and at least about 5 mole percent of the acrylamide moiety. The negative electrode can be a component of a negative electrode structure that comprises a metal foil current collector and the negative electrode on the current collector with the negative electrode structure having a 180 degree peel adhesion with a force of at least about 6 pound-force/meter and a cohesion corresponding to maintenance of electrode integrity when bent around a mandrel with a diameter of 6 mm. A lithium ion cell can comprise the negative electrode structure; a positive electrode structure comprising a current collector and on the current collector an electrode comprising a lithium metal oxide, conductive carbon, and a polymer binder; a separator between the negative electrode structure and the positive electrode structure; electrolyte comprising a lithium salt and non-aqueous solvent; and a container enclosing the electrode structures, the separator and the electrolyte.

In a further aspect, the invention pertains to a lithium ion cell comprising a negative electrode comprising a silicon based active material, nanoscale conductive carbon and polymer binder, wherein the polymer binder comprises a copolymer of acrylate salt and acrylamide; a positive electrode comprising a lithium metal oxide, conductive carbon, and a polymer binder; a separator between the negative electrode and the positive electrode; electrolyte comprising a lithium salt and non-aqueous solvent; and a container enclosing the electrodes, separator and electrolyte. In some embodiments, the lithium ion cell has a capacity at the 700th cycle of at least about 80% of the capacity at the 5th cycle when cycled from the 10th cycle to the 700th cycle between 2.5V and the selected charge voltage at a rate of 1C.

DETAILED DESCRIPTION OF THE INVENTION

Figure 1:
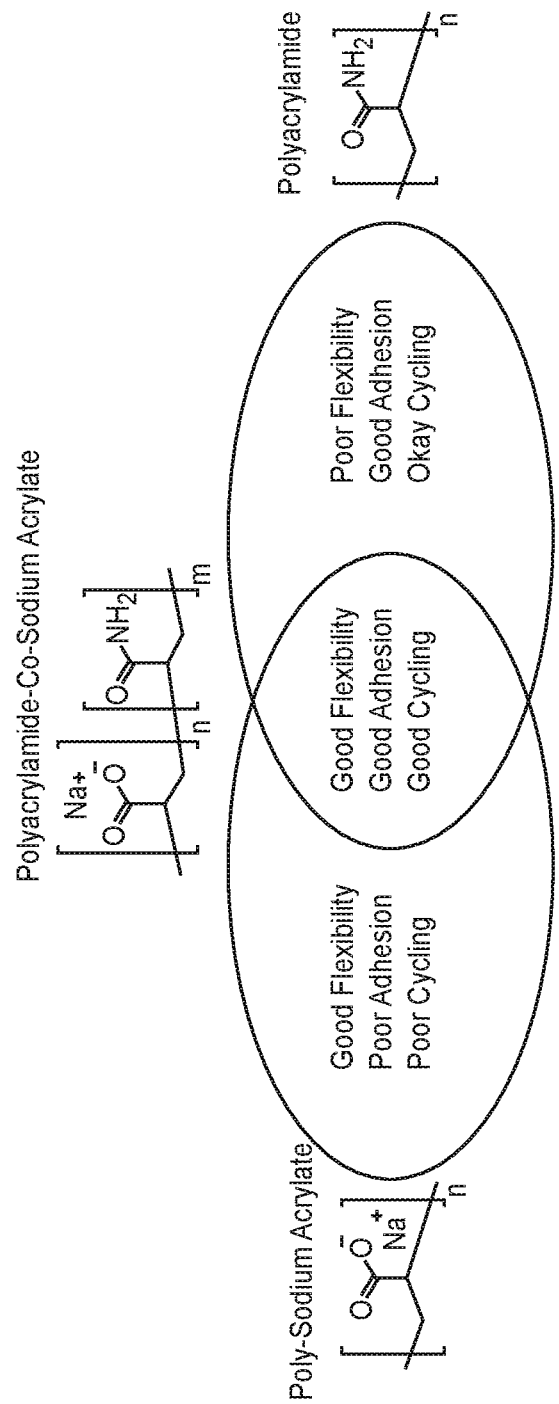
FIG. 1 is a Venn diagram suggesting how properties of separate polymers can be simultaneously exploited in the formation of copolymers of the binders described herein.
Figure 2:
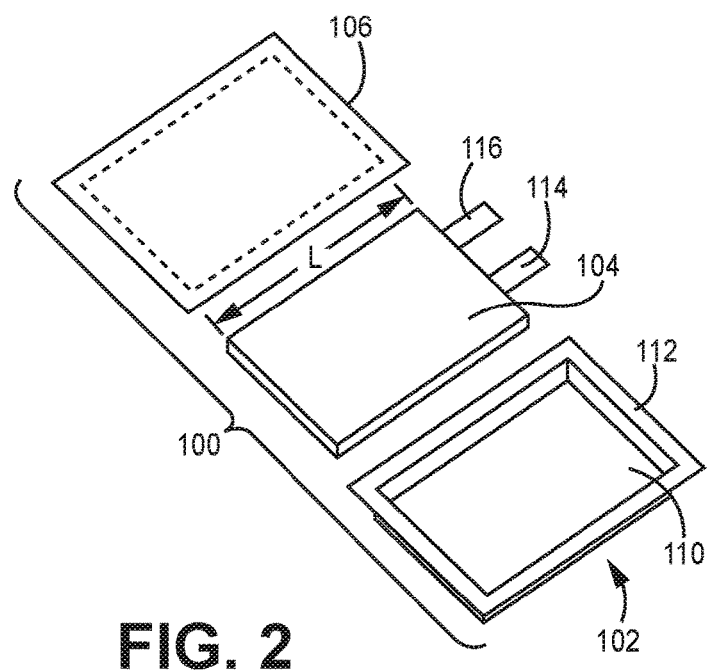
FIG. 2 is an expanded view of a pouch cell with a core separated from two portions of the pouch case.

Improved lithium ion cell cycling has been achieved with silicon based active materials assembled into an electrode using a polymer binder that is a copolymer of acrylic acid salt monomers (S-PAA), where the cation can be a meta cation such as $Na^+$, and acrylamide monomers. Desirable polymer binders are found to have both good adhesion with respect to the current collector and good particle to particle cohesion. The S-PAA monomers can contribute good cohesion, and the acrylamide co-monomer can contribute good adhesion. Binders based on a copolymer of S-PAA and acrylamide are described with appropriate proportions of the monomers to result in excellent cycling with silicon based negative electrode active materials. As demonstrated herein, significant improvements in cycling performance have been achieved relative to other polymer binders. The copolymer binders are also water processable, which provides a processing advantage. The improved cycling performance is particularly advantageous for vehicle applications where cycling is significant criteria for commercial suitability.

Lithium has been used in both primary and secondary cells. An attractive feature of lithium for cell or battery use is its light weight and the fact that it is the most electropositive metal, and aspects of these features can be advantageously captured in lithium-based cells also. Certain forms of metals, metal oxides, and carbon materials are known to incorporate lithium ions from the electrolyte into its structure through intercalation, alloying or similar mechanisms. The positive electrode of a lithium based cell generally comprises an active material that reversibly intercalates/alloys with lithium. Lithium ion cells generally refer to cells in which the negative electrode active material is also a lithium intercalation/alloying material. As used herein and for convenience, the terms cell and battery as well as variations thereof are used interchangeably unless some explicit distinction is recited.

The cells described herein are lithium ion cells that use a non-aqueous electrolyte solution which comprises lithium cations and suitable anions. For secondary lithium ion batteries during charge, oxidation takes place in the cathode (positive electrode) where lithium ions are extracted and electrons are released. During discharge, reduction takes place in the cathode where lithium ions are inserted and electrons are consumed. Similarly, during charge, reduction takes place at the anode (negative electrode) where lithium ions are taken up and electrons are consumed, and during discharge, oxidation takes place at the anode with lithium ions and electrons being released. Unless indicated otherwise, performance values referenced herein are at room temperature, i.e., about 23±2° C. As described below some of the testing of the electrodes with silicon based active materials is performed in lithium cells with a lithium metal electrode (referred to as half-cells) or in lithium ion cells with a positive electrode comprising a lithium metal oxide (referred to as full cells). In a half cell with a silicon based electrode, the lithium electrode acts as the negative electrode, and the silicon based electrode acts as the positive electrode, which is opposite of its usual role as the negative electrode in a lithium ion cell.

The word "element" is used herein in its conventional way as referring to a member of the periodic table in which the element has the appropriate oxidation state if the element is in a composition and in which the element is in its elemental form, $M^0$, when stated to be in an elemental form. Therefore, a metal element generally is only in a metallic state in its elemental form or an appropriate alloy of the metal's elemental form. In other words, a metal oxide or other metal composition, other than metal alloys, generally is not metallic.

When lithium ion batteries are in use, the uptake and release of lithium from the positive electrode and the negative electrode induces changes in the structure of the electroactive material. As long as these changes are essentially reversible, the capacity of the material does not change with cycling. However, the capacity of the active materials is observed to decrease with cycling to varying degrees. Thus, after a number of cycles, the performance of the cell falls below acceptable values, and the cell is replaced. Also, on the first cycle of the cell, generally there is an irreversible capacity loss that is significantly greater than per cycle capacity loss at subsequent cycles. The irreversible capacity loss (IRCL) is the difference between the charge capacity of the new cell and the first discharge capacity. Positive electrodes based on lithium metal oxides can exhibit some IRCL which results in some compensation for the negative electrode with respect to lithium available for cycling. The irreversible capacity loss can result in a corresponding decrease in the capacity, energy and power for the cell due to changes in the cell materials during the initial cycle.

Elemental silicon as well as other silicon based active materials have attracted significant amount of attention as a potential negative electrode material due to silicon's very high specific capacity with respect to intake and release of lithium. Elemental silicon forms an alloy with lithium, which can theoretically have a lithium content corresponding with more than 4 lithium atoms per silicon atom (e.g., $Li_{4.4}Si$). Thus, the theoretical specific capacity of silicon is on the order of 4000-4400 mAh/g, which is significantly larger than the theoretical capacity of about 370 mAh/g for graphite. Graphite is believed to intercalate lithium to a level of roughly 1 lithium atom for 6 carbon atoms ($LiC_6$). Also, elemental silicon, silicon alloys, silicon composites and the like can have a low potential relative to lithium metal similar to graphite. However, silicon undergoes a very large volume change upon alloying with lithium. A large volume expansion on the order of two to three times of the original volume or greater has been observed, and the large volume changes have been correlated with a significant decrease in the cycling stability of batteries having silicon-based negative electrodes. Silicon suboxides, i.e., SiOx, x<2, have also been found to be desirable active materials for lithium based batteries, which can have in some embodiments high specific capacities with respect to lithium alloying. The reference to silicon suboxide provides acknowledgement of silicon dioxide as the fully oxidized form of silicon. For convenience, silicon suboxide may be generally referred to as silicon oxide, which is not limited to silicon monoxide (SiO) unless specifically indicated. Silicon oxides are a widely used material in a range of fields, and the terminologies can be slightly different in the different fields, and silicon oxide can also be used to refer to $SiO_2$.

In embodiments of particular interest, the silicon based active materials can comprise elemental silicon, silicon suboxide and/or composites thereof, such as with carbon, as a primary active material. Silicon suboxide has been found particularly effective to achieve longer cycling stability. To stabilize the silicon based active materials as well as to increase electrical conductivity, carbon can be incorporated into a composite active material. With respect to carbon composites with nanoscale elemental silicon and/or silicon oxide, long cycling stability has remained challenging, although Applicant has achieved significant success with cycling stability with cells designed for both consumer electronics applications and vehicle applications. Longer cycling stability is exemplified herein based on the copolymer negative electrode binders with mixtures of electroactive graphite and silicon based composites along with other electrode design improvements, although for some applications suitable cycling may be achieved with silicon based composites as the sole negative electrode active material. As discussed in detail below, the silicon based electrodes can further comprise additional conductive sources, such as nanoscale carbon.

The active materials for lithium ion secondary cells herein generally include, for example, a positive electrode (i.e., cathode) active material with a moderately high average voltage against lithium and a silicon based active material for the negative electrode (i.e., anode). In general, various cathode materials can be used. For example, commercially available cathode active materials can be used with existing commercial production availability. Such cathode active materials include, for example, lithium cobalt oxide (LiCoO$_2$), LiNi$_{1/3}$Mn$_{1/3}$Co$_{1/3}$O$_2$ (L333 or NMC111), LiNiCoAlO$_2$ (NCA), other lithium nickel manganese cobalt oxides (NMC), LiMn$_2$O$_4$ (lithium manganese oxide spinel), modified versions thereof, or mixtures thereof.

Nickel rich-lithium nickel cobalt manganese oxides (LiNi$_x$Mn$_y$Co$_z$O$_2$, 0.45≤x, 0.05≤y, z≤0.35) can be of interest due to lower costs and lower flammability risk relative to lithium cobalt oxide as well as the ability to cycle at desirable voltage ranges. Specifically, desirable cycling results can be obtained from nickel-rich-lithium nickel manganese cobalt oxide (N-NMC), which can be represented by the formula LiNi$_x$Mn$_y$Co$_z$O$_2$, with x≥0.45 and x+y+z≈1. Commercially available formulations of these compounds include, for example, LiNi$_{0.5}$Mn$_{0.3}$Co$_{0.2}$O$_2$ (BASF), LiNi$_{0.6}$Mn$_{0.2}$Co$_{0.2}$O$_2$ (L&F, Korea and Umicore, Belgium), LiNi$_{0.8}$Mn$_{0.1}$Co$_{0.1}$O$_2$ (L&F, Korea, BASF, Germany, Umicore, Belgium and LG Chemical, Korea). In the industry, both NCM and NMC are used interchangeably with the cobalt and manganese listed in the corresponding order, and the presentations are equivalent and just based on a personal preference. Also, lithium cobalt oxide can be stabilized to cycle effectively at higher voltages as described in U.S. Pat. No. 10,193,135 to Sharma et al., entitled "Positive Electrode Active Materials With Composite Coatings for High Energy Density Secondary Batteries and Corresponding Processes," incorporated herein by reference.

As with silicon, oxygen deficient silicon oxide, e.g., silicon oxide, SiOx, 0.1≤x≤1.9, can intercalate/alloy with lithium such that the oxygen deficient silicon oxide can perform as an active material in a lithium based cell. The silicon oxide can incorporate a relatively large amount of lithium such that the material can exhibit a large specific capacity. However, silicon oxide is also observed generally to have a capacity that fades relatively quickly with cell cycling. Commercial silicon based material comprising SiO, which from some suppliers may be in a composite with carbon and silicon nanocrystals, is available from Alfa Aesar (USA), Sigma-Aldrich (USA), Shin-Etsu (Japan), Osaka Titanium Corporation (Japan), and Nanostructured and Amorphous Materials Corp. (USA). Additional specific suitable formulations of the silicon based compositions are described further below. Applicant has achieved cycling stabilization of silicon oxide based composite active materials using the electrode formulations described herein. In some embodiments, it can be desirable to have negative electrodes comprising a combination of graphitic carbon active material and silicon based active material to extend cycling life with an acceptable decrease in specific capacity, and the superior cycling performance exemplified herein uses such active material blends. Preliminary results suggest that the improved copolymer binders described herein can allow for sufficient cycling with silicon based composite active material without graphite for a broader range of applications.

Due to the large volume changes of silicon based material during cycling, electrode design has been a significant aspect of construction of cells with silicon based anodes to achieve desirable cycling. Part of the electrode design includes selection of a polymer binder that facilitates the maintenance of electrode integrity over cycling. As explained further below, polyimide was initially identified as a useful polymer binder for silicon based materials due to its mechanical strength. Thus, with the mechanical forces in the polymer associated with the material changes of the active material with the uptake or release of lithium, polyimide provides some stability to the electrode. Applicant then discovered that a blend of polymers with polyimide and a more elastic polymer further improved the electrode performance. The results herein with the copolymer binders presents another further improvement relative to polyimide based binders.

The achievement of stable cycling of silicon-based active materials in cells with a reasonable capacity and energy density has necessitated significant cell engineering. Applicant achieved significant progress in the cycling of negative electrodes with silicon based active materials initially using a polyimide binder and nanoscale carbon electrically conductive materials. See, U.S. Pat. No. 10,290,871 to Masarapu et al., entitled "Battery Cell Engineering and Design to Reach High energy," incorporated herein by reference. The high tensile strength and high elongation were believed to be significant features of the polyimide for contributing to the cycling properties. The polyimide binders were processible with organic solvents, although more recently developed polyimides are water processible, see UBE Industries polyimides.

Applicant achieved significant improvement in cycling using a binder with a polymer blend with polyimide and a more elastic binder, such as poly vinylidene fluoride, carboxymethyl cellulose, styrene-butadiene rubber, lithiated polyacrylic acid. The negative electrodes formed with the polymer blends incorporated nanoscale conductive carbon. The desirable cycling obtained with these polymer blends is described in published U.S. patent application 2019/0207209 to Venkatachalam et al. (hereinafter the '209 application), entitled "Electrodes with Silicon Oxide Active Materials for Lithium Ion Cells Achieving High Capacity, High Energy Density, And Long Cycle Life Performance," incorporated herein by reference.

As the work presented herein demonstrates, further improvement in polymer binders now make it possible to stably cycle silicon based active materials with high specific capacities for a larger number of cycles. Additional aspects of the significant cell engineering to achieve a large numbers of cycles without degradation of more than 80% of capacity relative to an activated cell are described in the '209 application. Electrode and cell design features are described in more detail below.

The polymer binders described herein are selected to achieve a balance of adhesion and cohesion. It is believed that the adhesion and cohesion parameters described herein have some relationship to the previously considered properties of tensile strength, elongation and elastic modulus, but the adhesion and cohesion are more directly measurable using the methodology described below. To achieve this balance of adhesion and cohesion, co-polymers are used that provide good adhesion based on one monomer (polyacrylamide) and good cohesion based on the other monomer (metal polyacrylate). The simultaneous achievement of good adhesion and good cohesion is found to be significant for achieving improved cycling. The polymer binders are also aqueous processable. Referring to FIG. 1, the principles described in this paragraph are shown with a Venn diagram.

The monomer units of the copolymer binder are an acrylamide and a salt of polyacrylic acid (S-PAA). The salt cation can be a metal cation, such as lithium (LiPAA) or sodium (NaPAA) or potassium (KPAA), although other metals can be used or non-metal cations, such as ammonium $NH_4^+$. A mixture of counter ions can be used if desired. S-PAA polymers are found to contribute strong cohesion to the corresponding electrodes. Cohesion is evaluated for the electrode structure on the current collector with bending around a mandrel with a particular diameter, as described further below. The diameter of the mandrel around which the electrode structure can be bent without losing the mechanical integrity of the electrode provides information on the cohesion of the electrode material. Adhesion is evaluated using commercial testing equipment with forces applied in a controlled fashion to evaluate the forces to pull the electrode from the current collector. The ratio of monomer units can be selected to achieve a desired balance of adhesive and cohesive stability.

The copolymer can be synthesized following published methods. Specifically, the acrylate groups can be formed from a nucleophilic substitution of amide groups by carboxylate groups with the extent of the reaction controlling the degree of acrylamide groups in the final polymer. Alternatively, the copolymer can be formed directly through the polymerization reactions. With the direct synthesis the relative amounts of carboxylate groups and acrylamide groups can be controlled. More information on the synthesis reactions is provided below. Also, the molecular weight of the polymers can be appropriately controlled or selected.

While Applicant has achieved significant progress with cycling of silicon based active materials using polyimides and blends of polyimides with lower modulus polymers, the current binders allow for further improvements in the cycling properties. As demonstrated herein, the cells can be cycled at rates of charge and discharge of 1C (charge/discharge in 1 hour) with cycling of over 800 cycles without dropping more than 20% of the initial cycling at the corresponding 1C rate after one or more formation cycles to initialize the cell.

Electrode Structures

The electrodes of the cell comprise the active material along with a binder and generally conductive additives. The electrodes are formed into a sheet, dried and pressed to achieve a desired density and porosity. The electrode sheets are generally formed directly on a metal current collector, such as a metal foil or a thin metal grid. For many cell structures, electrode layers are formed on both sides of the current collector to provide for desirable performance in the assembled cell or battery. The electrode layers on each side of the current collector can be considers elements of the same electrode structure since they are at the same potential in the cell, but the current collector itself, while part of the electrode structure is not generally considered part of the electrode since it is electrochemically inert. Thus, references to the physical aspects of an electrode generally refer to one layer of electrode composition within the electrode structure. An electrically conductive current collector can facilitate the flow of electrons between the electrode and an exterior circuit.

In some embodiments, when the positive electrode or negative electrode uses a high loading level, the density of the electrode can be reduced to provide good cycling stability of the electrode. The density of the electrodes is a function, within reasonable ranges, of the press pressures. Generally, the density of the electrodes cannot be arbitrarily increased without sacrificing performance with respect to loading levels while achieving desired cycling performance and capacity at higher discharge rates. The characterization of the specific negative electrode layers and positive electrode layers are presented in the following sections.

In some embodiments, a current collector can be formed from nickel, aluminum, stainless steel, copper or the like. An electrode material can be cast as a thin film onto a current collector. The electrode material with the current collector can then be dried, for example in an oven, to remove solvent from the electrode. In some embodiments, a dried electrode material in contact with a current collector foil or other structure can be subjected to a pressure from about 2 to about 10 $kg/cm^2$ (kilograms per square centimeter). The current collector used in the positive electrode can have a thickness from about 5 microns to about 30 microns, in other embodiments from about 10 microns to about 25 microns, and in further embodiments from about 14 microns to about 20 microns. In one embodiment, the positive electrode uses an aluminum foil current collector. The current collector used in the negative electrode can have a thickness from about 2 microns to about 20 microns, in other embodiments from about 4 microns to about 14 microns, and in further embodiments from about 6 microns to about 10 microns. In one embodiment, the negative electrode uses copper foil as current collector. A person of ordinary skill in the art will recognize that additional ranges of current collector thicknesses within the explicit ranges above are contemplated and are within the present disclosure.

Negative Electrodes

The basic electrode design comprises a blend of active compositions, polymer binder, and an electrically conductive diluent. As noted above, in some embodiments, the improved electrode designs can involve a copolymer binder and active compositions comprising silicon-based materials as well as nanoscale conductive carbon additives. The copolymers are discussed in detail in the following section. The active material can comprise, for example, a silicon-based composite material or a blend of active materials with a majority of silicon based active material, such as a silicon oxide composite, and in some embodiments at least 10 weight percent of distinct graphite. While the graphite can provide electrical conductivity to the electrode, it has also been found that in some embodiments a quantity of distinct nanoscale conductive carbon nevertheless can be significant toward the ability to produce a long cycling negative electrode. In general the nanoscale conductive carbon is not believed to be electrochemically active while the graphite is electrochemically active. These negative electrode design aspects are then incorporated into electrodes with further previously discovered silicon based electrode improvements.

Significant interest has been directed to high capacity negative electrode active material based on silicon. Applicant has had particular success with respect to cycling stability that has been achieved using materials primarily based on silicon oxide composites although significant work has also been performed on other silicon based active materials. Additional cycling stability can be obtained using a blend of a silicon based active material and active graphitic carbon. With the improved copolymer binders described herein, sufficient cycling stability can be obtainable to cycle silicon based active materials without separate active graphitic carbon for many applications.

Generally, an overall capacity of the negative electrode blended active material can be at least about 500 mAh/g, in some embodiments at least 750 mAh/g, in further embodiments at least about 900 mAh/g, in additional embodiments at least about 1000 mAh/g, in other embodiments at least about 1100 mAh/g, and in some embodiments at least about 1250 mAh/g cycled against lithium metal from 5 millivolts (mV) to 1.5V at a rate of C/3. While Applicant has been able to achieve desirable levels of cycling for silicon based active materials in negative electrodes, the degree of cycling stability, other design considerations are at play for certain applications. Thus, in some applications, higher cycling and lower energy density can be desirable such that a higher portion of graphite active material is appropriate, and in applications in which the higher energy densities are desirable, the improved binders provide for reasonable cycling for active materials that comprise up to fully silicon based composite active materials. For convenience, three ranges of active material are discussed, which form logical groupings, but are not restrictive in the sense of other broader groupings. With respect to the polymer binders described herein, these binders are suitable for electrodes having any measurable amount of silicon based active material, but they are particularly beneficial for electrodes with somewhat greater proportions of silicon based active materials.

In a first active material grouping, the blended active material can comprise at least about 25 wt % silicon based active material, in further embodiments at least about 27.5 wt % silicon based active material, in other embodiments from about 28 wt % to about 45 wt % silicon based active material, and in additional embodiments from about 30 wt % to about 42.5 wt % silicon based active material. Correspondingly, the blended active material can comprise no more than about 75 wt % graphite, in some embodiments from about 50 wt % graphite to about 72.5 wt % graphite, in further embodiments from about 55 wt % graphite to about 72 wt % graphite, in additional embodiments from about 57.5 wt % graphite to about 70 wt %. A person of ordinary skill in the art will recognize that additional ranges of specific discharge capacity and concentrations of silicon based active material within the explicit ranges above are contemplated and are within the present disclosure.

In a second active material grouping, the blended active material can comprise at least about 45 wt % silicon based active material, in further embodiments at least about 50 wt % silicon based active material, in other embodiments from about 55 wt % to about 95 wt % silicon based active material, and in additional embodiments from about 60 wt % to about 90 wt % silicon based active material. Correspondingly, the blended active material can comprise from about 5 wt % graphite to about 60 wt % graphite, in further embodiments from about 7 wt % graphite to about 50 wt % graphite, in additional embodiments from about 8 wt % graphite to about 45 wt %, and in other embodiments from about 10 wt % graphite to about 40 wt % graphite. A person of ordinary skill in the art will recognize that additional ranges of specific discharge capacity and concentrations of silicon based active material within the explicit ranges above are contemplated and are within the present disclosure.

In a third active material grouping, the blended active material can comprise at least about 95 wt % silicon based active material, in further embodiments at least about 97.5 wt % silicon based active material, and in other embodiments about 100 wt % silicon based active material. Correspondingly, the blended active material can comprise no more than about 5 wt % graphite, in further embodiments no more than about 2.5 wt % graphite, and in additional embodiments approximately no graphite. A person of ordinary skill in the art will recognize that additional ranges of specific discharge capacity and concentrations of silicon based active material within the explicit ranges above are contemplated and are within the present disclosure.

As noted above and described in detail below, suitable silicon based active materials can comprise a composite with a carbon component. Silicon based active materials are discussed in detail in the following section. A composite refers to a particulate material with components that are intimately combined into an integral material with effective uniformity over appropriate scales, in contrast with blends that involve mixtures held together with a polymer binder. Composite components that can comprise, for example, silicon, oxygen, carbon and the like. While not wanting to be limited by theory, it is not generally believed that a carbon component of a composite with silicon is active in electrochemistry and generally not graphitic, although the activity is an abstract concept given the intimate combination in the composite and the crystal structure may be extremely complex and difficult to evaluate. In any case, the carbon component of a composite material is readily understood by a person of ordinary skill in the art to be distinguishable from the distinct graphite not in a composite in active material blends. The examples below are based on a commercial composite composition believed to be comprising primarily of silicon suboxide with some amounts of elemental silicon crystals and elemental carbon in a combined composite particulate material.

Graphite is available commercially in natural and synthetic forms, and suitable graphite includes either natural or synthetic graphite or the like. Graphite is a crystalline form of carbon with covalently bonded carbon in sheets. As used herein, graphite refers to graphitic carbon without requiring perfect crystallinity, and some natural graphite materials can have some crystalline impurities. But the graphite refers generally to a material dominated by a graphitic structure, as would be recognized in the art. Graphite is electrically conductive along the plane of the covalent carbon sheets that are stacked in the crystal. The crystalline carbon in graphitic forms can intercalate lithium, so that it is an established electrochemically active material for lithium ion batteries.

Graphite particles can have average particle diameters from about 1 micron to about 30 microns, in further embodiments from about 1.5 microns to about 25 microns, and in other embodiments from about 2 microns to about 20 microns. In general, it is desirable for the graphite to not include particles greater than the electrode thickness to avoid a bumpy electrode surface, and graphitic particles with a size significantly less than a micron can be less crystalline. In some embodiments, the graphitic carbon can have a D50 (mass weighted median diameter) from about 5 microns to about 50 microns, in further embodiments from about 7 microns to about 45 microns and in additional embodiments from about 10 microns to about 8 microns to about 40 microns. Also, in some embodiments the BET surface area of graphitic carbon active material (which can be evaluated according to ISO 4652) can be from about 1 $m^2/g$ to about 100 $m^2/g$, in further embodiments from about 5 $m^2/g$ to about 85 $m^2/g$ and in additional embodiments from about 7.5 $m^2/g$ to about 60 $m^2/g$. A person of ordinary skill in the art will recognize that additional ranges of particle size and surface area for graphitic carbon active materials are contemplated and are within the present disclosure. In comparison, electrically conductive carbon blacks or the like (which have been referred to as paracrystalline) generally have surface areas of at least roughly 40 $m^2/g$ to 1000 $m^2/g$ or greater.

With respect to the polymer binder, Applicant has obtained reasonable cycling of silicon based cells using high tensile strength binders, e.g., polyimide binder. See U.S. Pat. No. 9,601,228 to Deng et al. (hereinafter the '228 patent) entitled: "Silicon Oxide Based High Capacity Anode Materials for Lithium Ion Batteries," incorporated herein by reference. Applicant further discovered improved cycling with a binder that has a blend of polyimide with a second polymer having a lower elastic modulus. See the '209 application cited above. The polymer binder blends provide a significant improvement in the cycling performance of the lithium ion cells with blends of silicon based active material and graphite active material.

As described herein, new copolymer binders have been identified that provide further cycling stabilization. The copolymers have first monomer units identified as providing good adhesion of the electrode to the current collector and second monomer units identified as providing good cohesion with respect to maintenance of electrode integrity when bending around a mandrel with a selected radius. The copolymer compositions, synthesis and properties are discussed in detail in the next section. The new polymer blends are water processable, which can be viewed as an advantage relative to organic solvent processible binders.

To form the electrode, the powders can be blended with the polymer in an aqueous liquid, such as purified water. The particulate components of the electrode, i.e., the active material and nanoscale conductive carbon, can be blended with the polymer binder blend in the solvent to form a paste. The resulting paste can be pressed into the electrode structure. Then, the electrode is dried to remove water. Since water is reactive in the assembled cell, the removal of water is significant. For example, the electrode can be dried under vacuum at temperatures from 90° C. to about 150° C. Excessive heat can potentially degrade the polymers. The drying generally can be performed for from 15 minutes to 15 hours. A person of ordinary skill in the art will recognize that additional ranges of drying temperatures and times within the explicit ranges above are contemplated sand are in the present disclosure.

The active material loading in the binder can be large. In some embodiments, the negative electrode has from about 75 to about 96 wt % of negative electrode active material, in other embodiments from about 78 to about 94 wt % of the negative electrode active material, and in further embodiments from about 80 to about 90 wt % of the negative electrode active material. In some embodiments, the negative electrode has from about 4 to about 20 wt % polymeric binder, in other embodiments about 5 to 19 wt % polymeric binder, and in further embodiments from about 6 to 18 wt % polymeric binder. Also, in some embodiments, the negative electrode comprises from about 0.05 to about 7 wt % nanoscale conductive carbon, in further embodiments from about 0.075 to about 6.5 wt %, and in additional embodiments from about 0.1 to about 6 wt % nanoscale conductive carbon. A person of ordinary skill in the art will recognize that additional ranges of polymer loadings within the explicit ranges above are contemplated and are within the present disclosure.

For improved cycling negative electrodes, nanoscale carbon additives or combinations thereof have been found to be particularly desirable. Nanoscale conductive carbon refers generally to particles of high surface area elemental carbon having at least two dimensions of the primary particles being submicron. Suitable nanoscale conductive carbon includes, for example, carbon black, carbon nanotubes and carbon nanofibers. In some embodiments, the nanoscale conductive carbon additive used in the negative electrode can comprise carbon nanotubes, carbon nanofibers, carbon nanoparticles (e.g., carbon black), or combinations thereof. In some embodiments, to achieve improved performance a conductive additive can have a conductivity of at least about 40 S/cm, in some embodiments at least about 50 S/cm, and in further embodiments at least about 60 S/cm. A person of ordinary skill in the art will recognize that additional ranges of particles loadings and conductivities within the explicit ranges about are contemplated and are within the present disclosure.

Electrical conductivity, which is the inverse of resistivity, can be reported by distributors, and the conductivity is generally measured using specific techniques developed by the distributors. For example, measurements of carbon black electrical resistance is performed between two copper electrodes with Super P™ carbon blacks, see Timcal Graphite & Carbon, A Synopsis of Analytical Procedures, 2008, www.timcal.com. Suitable supplemental electrically conductive additives can also be added to contribute to longer term cycling stability. Alternatively, some suppliers describe the conductive carbon concentrations to achieve the conductive percolation threshold.

Carbon black refers to synthetic carbon materials and can alternative be referred to as acetylene black, furnace black, thermal black or other names suggesting the synthesis approach. Carbon black generally is referred to as amorphous carbon, but there are suggestions of small domains with short or medium range order corresponding to graphite or diamond crystal structure in at least some forms of carbon black, but for practical purposes the material can be considered amorphous. Under ISO Technical Specification 80004-1 (2010) carbon black is a nanostructured material. The primary particles of carbon black can be on the order of tens of nanometers or less, but the primary particles are generally hard fused into chains or other aggregates, and the smallest dispersible units can be considered between about 80 nm and 800 nm, which is still submicron. Carbon blacks are available commercially that have been synthesized to provide a desirable level of electrical conductivity, such as Super-P® (Timcal), Ketjenblack® (Akzo Nobel), Shawinigan Black® (Chevron-Phillips), and Black Pearls 2000® (Cabot).

Carbon nanofibers are high aspect ratio fibers that generally comprise graphene layers in plates, cones or other forms, which carbon nanotubes comprise graphene sheets folded into tubes. Carbon nanofibers can have diameters of 250 nm or less and are commercially available, for example, Pyrograf® carbon nanofibers (Pyrograf Products, Inc.) or from American Elements, Inc. Carbon nanotubes have been found to be a desirable conductive additive that can improve cycling performance for either a positive electrode or a negative electrode. Single wall or multiwall carbon nanotubes are also available from American Elements, Inc. (CA, USA), Cnano Technologies (China), Cabot (MA, USA), TUBALL™ (OCSiAl, Luxemburg), Black Diamond (TX, USA), Fuji, Inc. (Japan), Alfa Aesar (MA, USA) or Nano-Labs (MA, USA).

The positive electrode and negative electrode used in the batteries described herein can have high active material loading levels along with reasonably high electrode density. For a particular active material loading level, the density is inversely correlated with thickness so that an electrode with a greater density is thinner than an electrode with a lower density. Loading is equal to the density times the thickness. In some embodiments, the negative electrode of the battery has a loading level of negative electrode active material that is at least about 1.5 mg/cm$^2$, in other embodiments from about 2 mg/cm$^2$ to about 8 mg/cm$^2$, in additional embodiments from about 2.5 mg/cm$^2$ to about 6 mg/cm$^2$, and in other embodiments from about 3 mg/cm$^2$ to about 4.5 mg/cm$^2$. In some embodiments, the negative electrode of the battery has an active material density in some embodiment from about 0.5 g/cc (cc=cubic centimeters (cm$^3$)) to about 2 g/cc, in other embodiment from about 0.6 g/cc to about 1.5 g/cc, and in additional embodiments from about 0.7 g/cc to about 1.3 g/cc. Similarly, the silicon oxide based electrodes can have an average dried thickness of at least about 15 microns, in further embodiments at least about 20 microns and in additional embodiments from about 25 microns to about 75 microns. The resulting silicon oxide based electrodes can exhibit capacities per unit area of at least about 3.5 mAh/cm$^2$, in further embodiments at least about 4.5 mAh/cm$^2$ and in additional embodiments at least about 6 mAh/cm$^2$. A person of ordinary skill in the art will recognize that additional ranges of active material loading level and electrode densities within the explicit ranges above are contemplated and are within the present disclosure.

Negative Electrode Copolymer Binder

As shown herein, it has been found that a copolymer of acrylamide monomer units and metal-poly acrylic acid/acrylate (M-PAA) provide improved cycling performance relative to previous successful binder systems based on polyimides for silicon based active materials. The relative amounts of acrylamide moieties and M-PAA moieties can be adjusted to correspondingly adjust the properties of the binder. Further testing of the polymers has revealed that good cycling binders exhibit both good adhesion and cohesion. While not wanting to be limited by theory, it can be rationalized that good cohesion and good adhesion contribute to the mechanical stability of the electrode as the cell is cycled and the active material undergoes significant reversible morphological changes during cycling. While not exemplified herein, the copolymers can also be blended with other polymers for forming electrode binders.

The focus herein is on random copolymers, although block copolymers should exhibit similar desirable binder properties. As described below, the "random" copolymers can nevertheless have some order for the monomer moieties in the copolymer since synthesis kinetics are influenced by the adjacent moieties. For the copolymers, one can consider two potential parameters to influence the binder properties: ratio of acrylamide moieties to M-PAA moieties and average molecular weight. Polymer molecular weights are generally indirectly measured, and accepted evaluation techniques for particular polymer types can be used, which in many circumstances involve rheology measurements. For polyacrylamides, the molecular weights can be calculated from established equations based on the measured intrinsic viscosity. The copolymer parameters are controlled through the synthesis process.

The molar ratio of acrylamide moieties to M-PAA moieties can range from about 5:95 to about 95:5, in further embodiments from about 10:90 to about 90:10, in additional embodiments from about 20:80 to about 80:20, in other embodiments from about 25:75 to about 75:25, and in some embodiments from about 30:70 to about 70:30. With respect to average molecular weight, the copolymer can have in some embodiments an average molecular weight from about 50,000 Daltons to about 5,000,000 Daltons, in further embodiments from about 75,000 Daltons to about 2,000,000 Daltons, and in other embodiments from about 100,000 Daltons to about 1,000,000 Daltons. A person of ordinary skill in the art will recognize that additional ranges of moiety ratios and average molecular weight within the explicit ranges above are contemplated and are within the present disclosure.

The copolymers can be characterized in terms of adhesion and cohesion, and corresponding results are presented in the Examples. Adhesion is measured by forming the electrode on the surface of the current collector using the selected protocol for electrode formation. The dimensions, such as thickness, can be selected to have a value for the electrode design of a corresponding cell. Adhesion is then measured with a 180-degree peel adhesion test, as described in detail in the Examples. The adhesion is evaluated by a force value from the test, which can be normalized according to the width of the adhesive element. In some embodiments, the normalized force can be at least 6 pound-force per meter (lbf/m), in further embodiments at least about 8 lbf/m, and in additional embodiments at least about 10 lbf/m. Cohesion was also evaluated using an electrode on one surface of the current collector. The electrode structure was bent, current collector side down, over a cylindrical mandrel such that opposing sides of the structure were parallel in a "U" shape. If the electrode maintained its integrity following the bending, the electrode was indicated as maintaining its cohesion. The diameter of the mandrel was reduced down to 2 mm, which was the smallest mandrel diameter tested. In general, in some embodiments, the copolymers exhibit cohesive stability bending over a mandrel with a diameter of 6 mm, in further embodiments, around a mandrel with a diameter of 4 mm, in additional embodiments around a mandrel with a diameter of 2 mm, and other embodiments less than 2 mm. Adhesion and cohesion results are presented in the Examples. A person of ordinary skill in the art will recognize that additional ranges of adhesion and cohesion within the explicit ranges above are contemplated and are within the present disclosure.

In one approach to synthesis of the copolymers, the starting material can be polyacrylamide, which is then subjected to hydrolysis to replace amide groups with carboxylate groups. The synthesis through hydrolysis and properties of the resulting polymers are described, for example, in a review article by Kurenkov et al., "Alkaline Hydrolysis of Polyacrylamide," Russian Journal of Applied Chemistry, Vol. 74 (4), 2001, pp; 543-554, in Higuchi et al., "Kinetic Aspects of Alkaline Hydrolysis of Poly(acrylamide)," Polymer Journal, Vol. 3(3), 1972, pp. 370-377, and in Kulicke et al., "Preparation and characterization of a series of poly (acrylamide-co-acrylates) with a copolymer composition between 0 and 96.3 mol-% acrylate units with the same degree and distribution of polymerization," Colloid & Polymer Science, Vol. 263, 1985, pp. 530-540, all of which are incorporated herein by reference. As explained in these articles, the resulting copolymer from the hydrolysis may not be fully a random copolymer since the neighboring groups influence the reaction kinetics. Comparisons between copolymers formed from polyacrylamide hydrolysis and direct polymerization is described in Klein et al., "Preparation and Characterization of Poly(acrylamide-co-acrylic acid), Makromo. Chem. Vol. 179, 1978, pp. 1895-1904, incorporated herein by reference. The Klein et al. article concludes that the polymer synthesized through direct copolymerization and through hydrolysis have the same monomer sequences as each other. Various poly(acrylamide-co-acrylate) polymers are also available commercially.

While hydrolysis of the amide groups can fragment the polymer chains, the conditions can be controlled to keep any chain fragmentation to low amounts. With this control used in the copolymer synthesis, the molecular weights of the product copolymers can be obtained from the molecular weights of the starting polyacrylamides with an adjustment for the altered molecular weights of the repeated moieties. The starting polyacrylamides can be obtained commercially, and suitable suppliers include, for example, PolySciences Inc. USA, Sigma-Aldrich, USA, TCI Japan].

While the copolymers for the Examples were synthesized as described below, copolymers are also available commercially where they are used as flocculants for liquid purification. In the flocculant art, copolymers as described herein may be referred to as anionic polyacrylamides.

While the Examples herein and the discussion generally focuses on the use of the copolymers alone as the electrode binders. Applicant has had success in improving binder performance using polymer blends. The copolymers described herein may be useful also in polymer blends. Suitable polymer blends would generally include at least 25 weight percent poly(acrylamide-co-M-PAA), in further embodiments at least about 35 wt %, and in other embodiments from about 40 wt % to about 90 wt %. A person of ordinary skill in the art will recognize that additional ranges within the explicit polymer blend rations above are contemplated and are within the present disclosure.

High Capacity Silicon Based Anode Materials

In general, the battery designs herein are based on a high capacity anode active material. Specifically, the anode active materials generally have a specific capacity of at least about 800 mAh/g, in further embodiments at least about 900 mAh/g, in additional embodiments at least about 1000 mAh/g, in some embodiments at least about 1150 mAh/g and in other embodiments at least about 1400 mAh/g when cycled at a rate of C/10 against lithium metal from 0.005V to 1.5V. As this implies, the specific capacity of negative electrode active material can be evaluated in a cell with a lithium metal counter electrode. However, in the batteries described herein, the negative electrodes can exhibit reasonably comparable specific capacities when cycled against high capacity lithium metal oxide positive electrode active materials. In the battery with non-lithium metal electrodes, the specific capacity of the respective electrodes can be evaluated by dividing the battery capacity by the respective weights of the active materials. As described herein, desirable cycling results can be obtained with a combination of a silicon based active material and a graphitic carbon active material with good capacities observed.

Elemental silicon, silicon alloys, silicon composites and the like can have a low potential relative to lithium metal similar to graphite. However, elemental silicon generally undergoes a very large volume change upon alloying with lithium. A large volume expansion on the order of two to four times of the original volume or greater has been observed, and the large volume changes have been correlated with a significant decrease in the cycling stability of batteries having silicon-based negative electrodes.

Commercially available composites of silicon suboxide, elemental silicon and carbon can be used in the cells described herein. Also, other formulations of silicon based negative electrode active materials have been developed with high capacity and reasonable cycling properties. Some silicon based compositions are described below that provide potential and promising alternatives to commercially available SiO based compositions.

Also, silicon based high capacity materials in a negative electrode of a lithium-based battery can exhibit in some formulations a large irreversible capacity loss (IRCL) in the first charge/discharge cycle of the battery. The high IRCL of a silicon-based anode can consume a significant portion of the capacity available for the battery's energy output. Since the cathode, i.e., positive electrode, supplies all of the lithium in a traditional lithium ion battery, a high IRCL in the anode, i.e., negative electrode, can result in a low energy battery. In order to compensate for the large anode IRCL, supplemental lithium can be added directly or indirectly to the negative electrode material to offset the IRCL. The use of supplemental lithium to improve the performance of silicon based electrodes is described also in the '294 application and '228 patent, both cited above and incorporated herein by reference. The use of supplemental lithium in the improved battery designs is described further below.

The anode of the batteries described herein can use nanostructured active silicon based materials to accommodate better for volume expansion and thus maintain the mechanical electrode stability and cycle life of the battery. Nanostructured silicon based negative electrode compositions are disclosed in the '294 application, the '228 patent, as well as U.S. Pat. No. 9,139,441 to Anguchamy et al. (the '441 patent), entitled: "Porous Silicon Based Anode Material Formed Using Metal Reduction," incorporated herein by reference. Suitable nanostructured silicon can include, for example, nanoporous silicon and nanoparticulate silicon. Also, nanostructured silicon can be formed into composites with carbon and/or alloys with other metal elements. The objective for the design of improved silicon-based materials is to further stabilize the negative electrode materials over cycling while maintaining a high specific capacity and in some embodiments reducing the irreversible capacity loss in the first charge and discharge cycle. Furthermore, pyrolytic carbon coatings are also observed to stabilize silicon-based materials with respect to battery performance.

Desirable high capacity negative electrode active materials can comprise porous silicon (pSi) based materials and/or composites of the porous silicon based materials. In general, the pSi based material comprises highly porous crystalline silicon that can provide high surface areas and/or high void volume relative to bulk silicon. While nanostructured porous silicon can be formed through a variety of approaches such as electrochemical etching of a silicon wafer, particularly good battery performance has been obtained from nanostructured porous silicon obtained by metal reduction of silicon oxide powders. In particular, the material has particularly good cycling properties while maintaining a high specific capacity. The formation of composites of pSi based material with carbon based material or metal can additionally mechanically stabilize the negative electrode for improved cycling. Additional description of the pSi based material from the reduction of silicon oxide can be found in the '441 patent referenced above.

With respect to the composite materials, nanostructured silicon components can be combined with, for example, carbon nanoparticles and/or carbon nanofibers within an intimate composite material. The components can be, for example, milled to form the composite, in which the materials are intimately associated. Generally, it is believed that the association has a mechanical characteristic, such as the softer silicon coated over or mechanically affixed with the harder carbon materials. In additional or alternative embodiments, the silicon can be milled with metal powders to form alloys, which may have a corresponding nanostructure. The carbon components can be combined with the silicon-metal alloys to form multi-component composites.

Also, carbon coatings can be applied over the silicon-based materials to improve electrical conductivity, and the carbon coatings seem to also stabilize the silicon based material with respect to improving cycling and decreasing irreversible capacity loss. Desirable carbon coatings can be formed by pyrolyzing organic compositions. The organic compositions can be pyrolyzed at relatively high temperatures, e.g., about 800° C. to about 900° C., to form a hard amorphous coating. In some embodiments, the desired organic compositions can be dissolved in a suitable solvent, such as water and/or volatile organic solvents for combining with the silicon based component. The dispersion can be well mixed with silicon-based composition. After drying the mixture to remove the solvent, the dried mixture with the silicon based material coated with the carbon precursor can be heated in an oxygen free atmosphere to pyrolyze the organic composition, such as organic polymers, some lower molecular solid organic compositions and the like, and to form a carbon coating.

As with silicon, oxygen deficient silicon oxide, e.g., silicon oxide, SiOx, $0.1 \leq x \leq 1.9$, can intercalate/alloy with lithium such that the oxygen deficient silicon oxide can perform as an active material in a lithium ion battery. These oxygen deficient silicon oxide materials are generally referred to as silicon oxide based materials and in some embodiments can contain various amounts of silicon, silicon oxide, and silicon dioxide. The oxygen deficient silicon oxide can incorporate a relatively large amount of lithium such that the material can exhibit a large specific capacity. However, silicon oxide is observed generally to have a capacity that fades quickly with battery cycling, as is observed with elemental silicon.

Silicon oxide based compositions have been formed into composite materials with high capacities and very good cycling properties as described in the '228 patent referenced above. In particular, oxygen deficient silicon oxides can be formed into composites with electrically conductive materials, such as conductive carbons or metal powders, which surprisingly significantly improve cycling while providing for high values of specific capacity. Furthermore, the milling of the silicon oxides into smaller particles, such as submicron structured materials, can further improve the performance of the materials.

In general, a range of composites can be used and can comprise silicon oxide, carbon components, such as graphitic particles (Gr), inert metal powders (M), elemental silicon (Si), especially nanoparticles, pyrolytic carbon coatings (HC), carbon nano fibers (CNF), or combinations thereof. The component structure may or may not correspond with the structure of the components within the composite material. Thus, the general compositions of the composites can be represented as $\alpha$SiO-$\beta$Gr-$\chi$HC-$\delta$M-$\varepsilon$CNF-$\phi$Si, where $\alpha$, $\beta$, $\chi$, $\delta$, $\varepsilon$, and $\phi$ are relative weights that can be selected such that $\alpha+\beta+\chi+\delta+\varepsilon+\phi=1$. Generally $0.35<\alpha<1$, $0\leq\beta<0.6$, $0\leq\chi<0.65$, $0\leq\delta<0.65$, $0\leq\varepsilon<0.65$, and $0\leq\phi<0.65$. Certain subsets of these composite ranges are of particular interest. In some embodiments, composites with SiO and one or more carbon based components are desirable, which can be represented by a formula $\alpha$SiO-$\beta$Gr-$\chi$HC-$\varepsilon$CNF, where $0.35<\alpha<0.9$, $0\leq\beta<0.6$, $0\leq\chi<0.65$ and $0\leq\varepsilon<0.65$ ($\delta=0$ and $\phi=0$), in further embodiments $0.35<\alpha<0.8$, $0.1\leq\beta<0.6$, $0.0\leq\chi<0.55$ and $0\leq\varepsilon<0.55$, in some embodiments $0.35<\alpha<0.8$, $0\leq\beta<0.45$, $0.0\leq\chi<0.55$ and $0.1\leq\varepsilon<0.65$, and in additional embodiments $0.35<\alpha<0.8$, $0\leq\beta<0.55$, $0.1\leq\chi<0.65$ and $0\leq\varepsilon<0.55$. In additional or alternative embodiments, composites with SiO, inert metal powders and optionally one or more conductive carbon components can be formed that can be represented by the formula $\alpha$SiO-$\beta$Gr-$\chi$HC-$\delta$M-$\varepsilon$CNF, where $0.35<\alpha<1$, $0\leq\beta<0.55$, $0\leq\chi<0.55$, $0.1\leq\delta<0.65$, and $0\leq\varepsilon<0.55$. In further additional or alternative embodiments, composites of SiO with elemental silicon and optionally one or more conductive carbon components can be formed that can be represented by the formula $\alpha$SiO-$\beta$Gr-$\chi$HC-$\varepsilon$CNF-$\phi$Si, where $0.35<\alpha<1$, $0\leq\beta<0.55$, $0\leq\chi<0.55$, $0\leq\varepsilon<0.55$, and $0.1\leq\phi<0.65$ and in further embodiments $0.35<\alpha<1$, $0\leq\beta<0.45$, $0.1\leq\chi<0.55$, $0\leq\varepsilon<0.45$, and $0.1\leq\phi<00.55$. A person or ordinary skill in the art will recognize that additional ranges within the explicit ranges above are contemplated and are within the present disclosure. As used herein, the reference to composites implies application of significant combining forces, such as from HEMM milling, to intimately associate the materials, in contrast with simple blending, which is not considered to form composites.

Solution based approaches for the synthesis of various Si—SiO$_x$—C-M (M=metal) composites are described in published U.S. patent application 2014/0308585 to Han et al., entitled "Silicon-Based Active Materials for Lithium Ion Batteries and Synthesis With Solution Processing," incorporated herein by reference. Silicon-based carbon composites with graphene sheets are described in published U.S. patent application 2014/0370387 to Anguchamy et al., entitled "Silicon-Silicon Oxide-Carbon Composites For Lithium Battery Electrodes and Methods for Forming the Composites," incorporated herein by reference. Commercial materials that are believed to comprise a SiO$_x$—Si—C or SiO$_x$—Si composite are used in the batteries in the Examples.

The capacity of the anode significantly influences the energy density of the battery. A higher specific capacity of the anode material results in a lower weight of the anode in the cell for the same output. When the negative electrode is made from a silicon based material, the electrode can have a discharge specific capacity at a rate of C/3 from about 800mAh/g to 2500mAh/g, in further embodiments from about 900 mAh/g to about 2300 mAh/g and in other embodiments from about 950 mAh/g to about 2200 mAh/g at C/3 discharge from 1.5V to 5 mV against lithium metal. A person of ordinary skill in the art will recognize that additional ranges of discharge specific capacity within the explicit ranges above are contemplated and are within the present disclosure.

Positive Electrodes

Various positive electrode chemistries can be introduced effectively with the improved negative electrodes described above. The selected compositions can be blended into positive electrode along with a suitable binder and electrically conductive materials. This section focuses on particularly desirable positive electrode active materials for high voltage cycling and moderately high capacity. Also, this section describes the overall electrode composition and properties.

To some degree, the desired application of the final cells can influence the selection of the positive electrode composition. From this perspective, a broad range of compositions are described in the following. For automotive use and for similar applications, a particular positive electrode chemistry has found to be desirable with respect to achieving high energy density along with cycling to over 600 cycles while maintaining at least 80% capacity, although some materials provide promising results with somewhat lesser cycling stability. Specifically, nickel-rich lithium nickel manganese cobalt oxides are found to provide the very long cycling performance herein based on the improved electrolytes described herein. Examples are presented below for a nickel rich lithium nickel manganese cobalt oxides. Lithium cobalt oxides can also be used to provide high energy density, although the cobalt can lead to higher cost. Other suitable positive electrode active materials include, for example, lithium and manganese rich lithium nickel cobalt manganese oxides, lithium manganese oxide spinels (such as, $LiMn_2O_4$), lithium iron phosphate ($LiFePO_4$), lithium nickel oxide ($LiNiO_2$), lithium nickel cobalt oxide ($LiNiCoO_2$), lithium nickel cobalt manganese oxide ($LiNiMnCoO_2$), lithium nickel cobalt aluminum oxide ($LiNiCoAlO_2$), and the like.

In additional embodiments, a blend of nickel-rich lithium nickel manganese cobalt oxide and (lithium+manganese) rich-lithium nickel manganese cobalt oxide are blended to provide reasonable positive electrode performance. Furthermore, the nickel rich lithium nickel manganese cobalt oxides alone as the active material can provide desirably high energy densities due to the average discharge voltage with good cycling when paired with the silicon based negative electrodes described herein. In general, such blends can comprise selected amounts of each active material, and in some embodiments the blends have at least 5 wt % of a nickel-rich lithium nickel cobalt manganese oxide and at least 5 wt % of a (lithium+manganese) rich lithium nickel cobalt manganese oxide. A person of ordinary skill in the art will recognize that additional ranges within the explicit ranges of proportions of active complex metal oxides above are contemplated and are within the present disclosure. In some embodiments, an approximately 50 wt %-50 wt % blend of nickel rich lithium nickel cobalt manganese oxide and (lithium+manganese) rich lithium nickel cobalt manganese oxide can be used.

Nickel-rich lithium nickel manganese cobalt oxides (N-NMC) can provide desirable cycling and capacity properties for the lithium ion batteries described herein. In particular, the nickel-rich compositions can be approximately represented by the formula $LiNi_xMn_yCo_zO_2$, $x+y+z\approx1$, $0.45\le x$, $0.025\le y$, $z\le0.35$, in further embodiments, $0.50\le x$, $0.03\le y$, $z\le0.325$, and in $0.55\le x$, $0.04\le y$, $z\le0.3$. The amount of nickel can influence the selected charge voltage to balance cycling stability and discharge energy density. For values of x in the range of $0.525\le x\le0.7$ a selected charge voltage can be from 4.25V to 4.375V. For values of x in the range of $0.7\le x\le0.9$, the selected charge voltage can be from 4.05V to 4.325V. A person of ordinary skill in the art will recognize that additional ranges of composition and selected charge voltages within the explicit ranges above are contemplated and are within the present disclosure. These composition have been found to provide relatively stable higher voltage cycling, good capacities and desirable impedance. N-NMC powders can be synthesized using techniques, such as coprecipitation described further below, and these are available commercially, such as from BASF (Germany), TODA (Japan), L&F Materials Corp. (Korea), Umicore (Belgium), and Jinhe Materials Corp. (China). N-NMC compounds of particular interest include NMC622 ($LiNi_{0.6}Mn_{0.2}Co_{0.2}O_2$) and NMC811 ($LiNi_{0.8}Mn_{0.1}Co_{0.1}O_2$), which are commercially available.

For the N-NMC compositions, the average voltage trends slightly larger with increasing amounts of nickel, but the charge voltage for stable cycling trends slightly lower with increasing nickel. Thus, there can be tradeoffs with active material selection, although the N-NMC active materials can provide good cycling and reasonably high capacity and energy density.

As noted above, desirable blends can comprise N-NMC with (lithium rich+manganese rich) lithium nickel manganese cobalt oxides (LM-NMC or HCMR®). These compositions can be approximately represented by the formula $Li_{1+b}Ni_\alpha Mn_\beta Co_\gamma A_\delta O_{2-z}F_z$, where $b+\alpha+\beta+\gamma+\delta\approx1$, b ranges from about 0.04 to about 0.3, $\alpha$ ranges from 0 to about 0.4, $\beta$ range from about 0.2 to about 0.65, $\gamma$ ranges from 0 to about 0.46, $\delta$ ranges from about 0 to about 0.15 and z ranges from 0 to 0.2, with the proviso that both $\alpha$ and $\gamma$ are not 0, and where A is a metal different from lithium, manganese, nickel and cobalt. In some embodiments, A can be Mg, Sr, Ba, Cd, Zn, Al, Ga, B, Zr, Ti, Ca, Ce, Y, Nb, Cr, Fe, V, or combinations thereof. Also, in additional or alternative embodiments, $Li_{1+b}Ni_\alpha Mn_\beta Co_\gamma A_\delta O_2$ with $0.05\le b\le0.125$, $0.225\le\alpha\le0.35$, $0.35\le\beta\le0.45$, $0.15\le\gamma\le0.3$, $0\le\delta\le0.05$ and up to five mole percent of the oxygen can be replaced with a fluorine dopant. A person of ordinary skill in the art will recognize that additional ranges of composition within the explicit ranges above are contemplated and are within the present disclosure. Long cycle stability has been achieved for (lithium+manganese) rich-NMC active materials at relatively high cycling voltages, as described in U.S. Pat. No. 8,928,286 to Amiruddin et al., entitled "Very Long Cycling of Lithium Batteries With Lithium Rich Cathode Materials," incorporated herein by reference.

The LM-NMC positive electrode material can be advantageously synthesized by co-precipitation and sol-gel processes detailed in the '160 patent and the '873 patent. In some embodiments, the positive electrode material is synthesized by precipitating a mixed metal hydroxide or carbonate composition from a solution comprising +2 cations wherein the hydroxide or carbonate composition has a selected composition. The metal hydroxide or carbonate precipitates are then subjected to one or more heat treatments to form a crystalline layered lithium metal oxide composition. A carbonate co-precipitation process described in the '873 patent gave desired lithium rich metal oxide materials having cobalt in the composition and exhibiting the high specific capacity performance with superior tap density. These patents also describe the effective use of metal fluoride coatings to improve performance and cycling.

It is found that for LM-NMC positive electrode active materials a coating on the material can improve the performance of corresponding cells. Suitable coating materials, which are generally believed to be electrochemically inert during battery cycling, can comprise metal fluorides, metal oxides, or metal non-fluoride halides. The results in the Examples below relating to LM-NMC are obtained with LM-NMC materials coated with metal fluorides. Improved metal fluoride coatings with appropriately engineered thicknesses are described in U.S. Pat. No. 9,843,041 to Lopez et al, entitled "Coated Positive Electrode Materials for Lithium Ion Batteries," incorporated herein by reference. Suitable metal oxide coatings are described further, for example, in U.S. Pat. No. 8,535,832B2 to Karthikeyan et al. entitled "Metal Oxide Coated Positive Electrode Materials for Lithium-Based Batteries", incorporated herein by reference. The discovery of non-fluoride metal halides as desirable coatings for cathode active materials is described in U.S. Pat. No. 8,663,849B2 to Venkatachalam et al., entitled "Metal Halide Coatings on Lithium Ion Battery Positive Electrode Materials and Corresponding Batteries," incorporated herein by reference.

As noted above, the positive electrode generally comprises active material, with an electrically conductive material within a binder. The active material loading in the electrode can be large. In some embodiments, the positive electrode comprises from about 85 to about 99% of positive electrode active material, in other embodiments from about 90 to about 98% of the positive electrode active material, and in further embodiments from about 95 to about 97.5% of the positive electrode active material. In some embodiments, the positive electrode has from about 0.75 to about 10% polymeric binder, in other embodiments from about 0.8 to about 7.5% polymeric binder, and in further embodiments from about 0.9 to about 5% polymeric binder. The positive electrode composition generally can also comprise an electrically conductive additive distinct from the electroactive composition. In some embodiments, the positive electrode can have 0.4 weight percent to about 12 weight percent conductive additive, in further embodiments from about 0.45 weight percent to about 7 weight percent, and in other embodiments from about 0.5 weight percent to about 5 weight percent conductive additive. A person of ordinary skill in the art will recognize that additional ranges of particles loadings within the explicit ranges about are contemplated and are within the present disclosure. The positive electrode active materials are described above. Suitable polymer binders for the positive electrode include, for example, polyvinylidine fluoride, polyethylene oxide, polyimide, polyethylene, polypropylene, polytetrafluoroethylene, polyacrylates, rubbers, e.g. ethylene-propylene-diene monomer (EPDM) rubber or styrene butadiene rubber (SBR), copolymers thereof, or mixtures thereof. For the positive electrode, polyvinylidiene fluoride (pvdf) can be used with good results, and the positive electrodes in the examples use a pvdf binder. Electrically conductive additives are described in detail for the negative electrode, and nanoscale conductive carbon can be used effectively for the positive electrode.

For a particular loading level, the electrode density (of active material) is inversely correlated with thickness so that an electrode with a greater density is thinner than an electrode with a lower density. Loading is equal to the density times the thickness. In some embodiments, the positive electrode of the battery has a loading level of positive electrode active material that is from about 10 to about 50 mg/cm$^2$, in other embodiments from about 12 to about 45 mg/cm$^2$, in additional embodiments from about 13 to about 40 mg/cm$^2$, in some embodiments from about 15 to about 37.5 mg/cm$^2$ and in other embodiments from 20 to about 35 mg/cm$^2$ In some embodiments, the positive electrode of the battery has an active material density in some embodiment from about 2.5 g/cc to about 4.6 g/cc, in other embodiment from about 3.0 g/cc to 4.4 g/cc, and in additional embodiment from about 3.25 g/cc to about 4.3 g/cc. In further embodiments, the positive electrodes can have a thickness on each side of the current collector following compression and drying of the positive electrode material from about 45 microns to about 300 microns, in some embodiments from about 80 microns to about 275 microns and in additional embodiments from about 90 microns to about 250 microns. A person of ordinary skill in the art will recognize that additional ranges of active material loading level, electrode thickness and electrode densities within the explicit ranges above are contemplated and are within the present disclosure.

Supplemental Lithium

The improved high energy battery designs described herein generally comprise supplemental lithium, and this section is directed to approaches for the incorporation of supplemental lithium for appropriate embodiments. In general, the inclusion of supplemental lithium is desirable for cells with silicon-based negative electrode active materials since the material exhibit relatively high irreversible capacity loss during the initial charge of the battery. Various approaches can be used for the introduction of supplemental lithium into the battery, although following corresponding initial reactions and/or charging, the negative electrode becomes associated with excess lithium for cycling from the supplemental lithium. With respect to the negative electrode in batteries having supplemental lithium, the structure and/or composition of the negative electrode can change relative to its initial structure and composition following the first cycle as well as following additional cycling.

Depending on the approach for the introduction of the supplemental lithium, the positive electrode may initially comprise a source of supplemental lithium and/or a sacrificial electrode can be introduced comprising supplemental lithium. Additionally or alternatively, supplemental lithium can be associated with the negative electrode. In some embodiments, the supplemental lithium can be introduced into the negative electrode using electrochemical methods in contrast with purely chemical or mechanical methods. If the supplemental lithium is initially located in the positive electrode or a separate electrode, the negative electrode can be an unaltered form with no lithium present until the battery is charged or at least until the circuit is closed between the negative electrode and the electrode with the supplemental lithium in the presence of electrolyte and a separator. For example, the positive electrode or supplemental electrode can comprise elemental lithium, lithium alloy and/or other sacrificial lithium source in addition to other electrode components.

If sacrificial lithium is included in the positive electrode, the lithium from the sacrificial lithium source is loaded into the negative electrode during the charge reaction. The voltage during the charging based on the sacrificial lithium source may be significantly different than the voltage when the charging is performed based on the positive electrode active material. For example, elemental lithium in the positive electrode can charge the negative electrode active material without application of an external voltage since oxidation of the elemental lithium can drive the reaction as long as the circuit is closed. For some sacrificial lithium source materials, an external voltage is applied to oxidize the sacrificial lithium source in the positive electrode and drive lithium into the negative electrode active material. The charging generally can be performed using a constant current, a stepwise constant voltage charge or other convenient charging scheme. However, at the end of the charging process, the battery should be charged to a desired voltage, which then also involves extraction of lithium (e.g., de-intercalation or de-alloying) from the positive electrode active material.

In further embodiments, at least a portion of the supplemental lithium is initially associated with the negative electrode. For example, the supplemental lithium can be in the form of elemental lithium, a lithium alloy or other lithium source that is more electronegative than the negative electrode active material. Elemental lithium can be in the form of a thin film, such as formed by evaporation, sputtering or ablation, a lithium or lithium alloy foil and/or a powder. Elemental lithium, especially in powder form, can be coated to stabilize the lithium for handling purposes, and commercial lithium powders, such as powders from Livent Corporation, are sold with proprietary coatings for stability. The coatings generally do not alter the performance of the lithium powders for electrochemical applications. After the negative electrode is in contact with electrolyte, a reaction can take place, and the supplemental lithium is transferred to the negative electrode active material. Since the electrode is electrically conductive internally, the circuit does not need to be closed to provide for electron flow resulting from the reactions. During this process, the solid electrolyte interface (SEI) layer may also be formed. Thus, the supplemental lithium is loaded into the negative electrode active material with at least a portion generally consumed in formation of the SEI layer. Supplemental lithium placed into the negative electrode should be more electronegative than the active material in the negative electrode since there is no way of reacting the supplemental lithium source with the active material in the same electrode through the application of a voltage.

In some embodiments, supplemental lithium associated with the negative electrode can be incorporated as a powder within the negative electrode. Specifically, the negative electrode can comprise an active negative electrode composition and a supplemental lithium source within a polymer binder matrix, and any electrically conductive powder if present. In additional or alternative embodiments, the supplemental lithium is placed along the surface of the electrode. For example, the negative electrode can comprise an active layer with an active negative electrode composition and a supplemental lithium source layer on the surface of active layer. The supplemental lithium source layer can comprise a foil sheet of lithium or lithium alloy, supplemental lithium powder within a polymer binder and/or particles of supplemental lithium source material placed on the surface of the active layer. In an alternative configuration, a supplemental lithium source layer is between the active layer and current collector. Also, in some embodiments, the negative electrode can comprise supplemental lithium source layers on both surfaces of the active layer.

An arrangement to perform electrochemical preloading of lithium can comprise an electrode with silicon-based active material formed on a current collector, which are placed in vessel containing electrolyte and a sheet of lithium source material contacting the electrode. The sheet of lithium source material can comprise lithium foil, lithium alloy foil or a lithium source material in a polymer binder optionally along with an electrically conductive powder, which is in direct contact with the negative electrode to be preloaded with lithium such that electrons can flow between the materials to maintain electrical neutrality while the respective reactions take place. In the ensuing reaction, lithium is loaded into the silicon based active material through intercalation, alloying or the like. In alternative or additional embodiments, the negative electrode active material can be mixed in the electrolyte and the lithium source material for incorporation of the supplemental lithium prior to formation into an electrode with a polymer binder so that the respective materials can react in the electrolyte spontaneously.

In some embodiments, a lithium source within an electrode can be assembled into a cell with the electrode to be preloaded with lithium. A separator can be placed between the respective electrodes. Current can be allowed to flow between the electrodes to provide for controlled electrochemical prelithiation. Depending on the composition of the lithium source it may or may not be necessary to apply a voltage to drive the lithium deposition within the silicon-based active material. An apparatus to perform this lithiation process can comprise a container holding electrolyte and a cell, which comprises an electrode, to be used as a negative electrode in an ultimate battery, a current collector, a separator and a sacrificial electrode that comprises the lithium source, such as lithium metal foil, where the separator is between the sacrificial electrode and the electrode with the silicon-based active material. A convenient sacrificial electrode can comprise lithium foil, lithium powder embedded in a polymer or lithium alloys, although any electrode with extractable lithium can be used. The container for the lithiation cell can comprise a conventional battery housing, a beaker, or any other convenient structure. This configuration provides the advantage of being able to measure the current flow to meter the degree of lithiation of the negative electrode. Furthermore, the negative electrode can be cycled once or more than once in which the negative electrode active material is loaded close to full loading with lithium. In this way, an SEI layer can be formed with a desired degree of control during the preloading with lithium of the negative electrode active material. Then, the negative electrode is fully formed during the preparation of the negative electrode with a selected preloading with lithium.

In general, for embodiments in which supplemental lithium is used, the amount of supplemental lithium preloaded or available to load into the active composition can be in an amount of at least about 2.5% of capacity, in further embodiments from about 3 percent to about 55 percent of capacity, in additional embodiments from about 5 percent to about 52.5 percent of capacity, and in some embodiments from about 5 percent to about 50 percent of the negative electrode active material capacity. The supplemental lithium can be selected to approximately balance the IRCL of the negative electrode, although other amounts of supplemental lithium can be used as desired. In some embodiment, the supplemental lithium added is in an amount with an oxidation capacity corresponding to from 60% to 180% of the first cycle IRCL of the negative electrode, in further embodiments, it is from 80% to 165%, and in other embodiments from 90% to 155%. A person of ordinary skill in the art will recognize that additional ranges of percentage within the explicit ranges above are contemplated and are within the present disclosure. Thus, the contribution to the IRCL of the negative electrode can be effectively reduced or removed due to the addition of the supplemental lithium such that the measured IRCL of the battery represents partially or mostly contributions from the IRCL of the positive electrode, which is not diminished due to the presence of supplemental lithium. A person of ordinary skill in the art will recognize that additional ranges of IRCL within the explicit ranges above are contemplated and are within the present disclosure.

Balance of Cathode and Anode

The overall performance of the battery has been found to depend on the capacities of both the negative electrode and positive electrode and their relative balance. Balance of the electrodes has been found to be significant with respect to achieving a particularly high energy density for the battery as well as to achieve good cycling properties. In some embodiments, there may be a tradeoff with respect to achieving longer cycling stability and energy density. To achieve longer cycling stability, it can be desirable to balance the battery to achieve a relatively lower energy density, but with a battery suitable for stable long term use under a broader range of operating parameters. With appropriately selected active materials, desirable electrode designs and improved electrolyte formulations, high energy densities are still achievable while obtaining cycling to more than 800 cycles with no more than 80% capacity drop. The electrode balance can be evaluated in several alternative ways, which can work effectively when properly accounting for the particular evaluation approach.

Testing of active materials can be performed in lithium cells with a lithium metal electrode, and such cells are generally referred to as half-cells, in contrast with lithium ion cells with both electrodes comprising a lithium alloying or intercalation material (referred to as full cells). In a half cell with a silicon based electrode, the lithium electrode acts as the negative electrode, and the silicon based electrode acts as the positive electrode, which is opposite of its usual role as the negative electrode in a lithium ion cell.

The positive electrode active material capacity can be estimated from the capacity of the material which can be measured by cycling the material against lithium metal foil. For example, for a given positive electrode, the capacity can be evaluated by determining the insertion and extraction capacities during the first charge/discharge cycle, where the lithium is de-intercalated or extracted from the positive electrode to a voltage selected based on the material chemistry and the selected charge voltage of the cell design (generally from 4.2V to 4.5V) and intercalated or inserted back into the positive electrode to 2V at a rate of C/20, with a slight adjustment, e.g. generally 0.1V, to a higher charge voltage against the lithium metal based on the voltage of the ultimate anode relative to lithium metal. Similarly, for a given silicon based electrode, the insertion and extraction capacities can be evaluated with a battery having a positive electrode comprising the silicon based active material and a lithium foil negative electrode. The capacity is evaluated by determining the insertion and extraction capacities of the battery during the first charge/discharge cycle where lithium is intercalated/alloyed to the silicon based electrode to 5 mV and de-intercalated/de-alloyed to 1.5V at a rate of C/20. In actual use, the observed capacities can change from the tested capacities due to various factors, such as high rate operation and alteration of voltage range, which can be due to battery design as well as due to composition of the counter electrode not being lithium metal. For some evaluation approaches, a subsequent capacity after the first cycle can be used to evaluate electrode balance, and if desired a greater discharge rate can be used, such as C/3 or C/10. The use of the balance after a formation cycle or a few formation cycles can be desirable in that the balance is based more on conditions during use of the battery.

In most commercially available carbon based batteries, approximately 7-10% excess anode is taken over the cathode to prevent lithium plating. One important concern of too much excess anode is that the weight of the cell will increase reducing the energy density of the cell. Compared to graphite which has a first cycle IRCL of ~7%, high capacity silicon based anodes can have IRCL ranging from about 10% to about 40%. A significant portion of the capacity may become inactive in the cell after the first charge-discharge cycle and add to significant dead weight to the battery.

For high capacity anode materials, the negative electrode irreversible capacity loss generally is greater than the positive electrode irreversible capacity loss, which generates additional lithium availability for the cell. If the negative electrode has a significantly higher irreversible capacity loss than the positive electrode, the initial charge of the negative electrode irreversibly consumes lithium so that upon subsequent discharge, the negative electrode cannot supply enough lithium to provide the positive electrode with sufficient lithium to satisfy the full lithium accepting capacity of the positive electrode. This results in a waste of positive electrode capacity, which correspondingly adds weight that does not contribute to cycling. Most or all of the lithium loss from the net IRCL (negative electrode IRCL minus positive electrode IRCL) can be compensated by supplemental lithium as described above. Evaluation of electrode balance during the 1st formation cycle may or may not account for supplemental lithium. In subsequent cycles after the formation cycle or a few cycles, any excess supplemental lithium not consumed for the IRCL is generally alloyed into the anode material. The electrode balance can be evaluated at a cycling stage after formation, such as the 4th cycle at a selected rate, and these capacities can be estimated from the electrode performances.

From the perspective of providing stable longer term cycling performance, it can be desirable to balance the electrodes to provide for effective use of both electrode capacities as well as avoiding the plating of lithium metal during cycling. In general, the balance of the electrodes is considered at the time of assembly of the electrodes referencing the initial capacities of the electrodes relative to lithium metal.

In general, battery life can be selected to end when the energy output drops by roughly 20% from the initial capacity at a constant discharge rate, although other values can be selected as desired. For the materials described herein, the drop in capacity with cycling of the negative electrode is generally greater than for the positive electrode, so that the avoidance of lithium metal deposition with cycling suggests a greater excess capacity of the negative electrode to further stabilize cycling. Roughly, if the negative electrode capacity fades about twice as fast as the positive electrode capacity, it would be desirable to include at least 10% additional negative electrode capacity to account for cycling. In the robust battery design, at least about 10% additional negative electrode can be desired at various discharge conditions. In general, the balance can be selected such that the initial negative electrode charge capacity evaluated at a rate of C/20 from an open circuit voltage to 1.5V against lithium is about 110% to about 195%, in further embodiment from about 120% to about 185% and in additional embodiments from about 130% to about 190% relative to the sum of the initial positive electrode charge capacity at a rate of C/20 from an open circuit voltage to the charge voltage of the cell design (generally from 4.2V to 4.6V) plus the oxidation capacity of any supplemental lithium. Alternatively, the electrode balance can be evaluated at the fourth cycle at a discharge rate of C/10 or C/3 with the negative electrode capacity relative to positive electrode capacity from about 110% to about 195%, in further embodiment from about 120% to about 185% and in additional embodiments from about 130% to about 190%. A person of ordinary skill in the art will recognize that additional ranges of balance within the explicit ranges above are contemplated and are within the present disclosure. Such a balance is described in the battery designs described below.

General Battery Features

The negative electrode and positive electrode structures described above can be assembled into appropriate cells. As noted above, the electrodes are generally formed in association with current collectors to form electrode structures. A separator is located between a positive electrode and a negative electrode to form a cell. The separator is electrically insulating while providing for at least selected ion conduction between the two electrodes. A variety of materials can be used as separators. Some commercial separator materials can be formed from polymers, such as polyethylene and/or polypropylene that are porous sheets that provide for ionic conduction. Commercial polymer separators include, for example, the Celgard® line of separator material from Asahi Kasei Japan. Also, ceramic-polymer composite materials have been developed for separator applications. These ceramic composite separators can be stable at higher temperatures, and the composite materials can reduce the fire risk. Polymer-ceramic composites for lithium ion battery separators are sold under the trademark Separion® by Evonik Industries, Germany and Lielsort® by Tiejin Lielsort Korea Co., Ltd. Also, separators can be formed using porous polymer sheets coated with a gel-forming polymer. Such separator designs are described further in U.S. Pat. No. 7,794,511 B2 to Wensley et al., entitled "Battery Separator for Lithium Polymer Battery," incorporated herein by reference. Suitable gel-forming polymers include, for example, polyvinylidene fluoride (pvdf), polyurethane, polyethylene oxide (PEO), polypropylene oxide (PPO), polyacylonitrile, gelatin, polyacrylamide, polymethylacrylate, polymethylmethacrylate, polyvinylacetate, polyvinylpyrrolidone, polytetraethylene glycol diacrylate, copolymers thereof, and mixtures thereof.

Electrolyte provides for ion transport between the anode and cathode of the battery during the charge and discharge processes. We refer to solutions comprising solvated ions as electrolytes, and ionic compositions that dissolve to form solvated ions in appropriate liquids are referred to as electrolyte salts. Electrolytes for lithium ion batteries can comprise one or more selected lithium salts. Appropriate lithium salts generally have inert anions. Suitable lithium salts include, for example, lithium hexafluorophosphate, lithium hexafluoroarsenate, lithium bis(trifluoromethyl sulfonyl imide), lithium trifluoromethane sulfonate, lithium tris(trifluoromethyl sulfonyl) methide, lithium tetrafluoroborate, lithium perchlorate, lithium tetrachloroaluminate, lithium chloride, lithium difluoro oxalato borate, and combinations thereof. In some embodiments, the electrolyte comprises a 1 M to 2M concentration of the lithium salts, although greater or lesser concentrations can be used.

For lithium ion batteries of interest, a non-aqueous liquid is generally used to dissolve the lithium salt(s). The solvent generally does not dissolve the electroactive materials. In some embodiments, appropriate solvents can include, for example, propylene carbonate, dimethyl carbonate, diethyl carbonate, 2-methyl tetrahydrofuran, dioxolane, tetrahydrofuran, methyl ethyl carbonate, γ-butyrolactone, dimethyl sulfoxide, acetonitrile, formamide, dimethyl formamide, triglyme (tri(ethylene glycol) dimethyl ether), diglyme (diethylene glycol dimethyl ether), DME (glyme or 1,2-dimethyloxyethane or ethylene glycol dimethyl ether), nitromethane and mixtures thereof. Particularly useful solvents for high voltage lithium-ion batteries are described further in U.S. Pat. No. 8,993,177 to Amiruddin et al., entitled "Lithium ion battery with high voltage electrolytes and additives", incorporated herein by reference.

Electrolyte with fluorinated additives has shown to further improve the battery performance for some embodiments of cells with silicon based negative electrode active material. The fluorinated additives can include, for example, fluoroethylene carbonate, fluorinated vinyl carbonate, monochloro ethylene carbonate, monobromo ethylene carbonate, 4-(2,2,3,3-tetrafluoropropoxymethyl)-[1,3]dioxolan-2-one, 4-(2,3,3-tetrafluoro-2-trifluoro methyl-propyl)-[1,3]dioxolan-2-one, 4-trifluoromethyl-1,3-dioxolan-2-one, bis(2,2,3,3-tetrafluoro-propyl) carbonate, bis(2,2,3,3,3-pentafluoro-propyl) carbonate, or mixtures thereof. In some embodiments, the electrolyte can comprise from about 1 weight percent to about 55 weight percent halogenated carbonate, in further embodiments from about 3 weight percent to about 50 weight percent and in other embodiments from about 5 weight percent to about 45 weight percent halogenated carbonate in the electrolyte as a fraction of the total electrolyte weight. A person of ordinary skill in the art will recognize that additional ranges of halogenated carbonate concentrations within the explicit ranges above are contemplated and are within the present disclosure. Also, electrolytes with fluoroethylene carbonate have been found to have excellent low temperature performance as described in published U.S. patent application 2013/0157147 to Li et al. (the '147 application), entitled "Low Temperature Electrolyte for High Capacity Lithium Based Batteries," incorporated herein by reference. Additional fluorinated additives include, for example, fluorinated ethers, as described in published U.S. patent application 2018/0062206 to Li et al., entitled "Fluorinated Ether as Electrolyte Co-Solvent for Lithium Metal Based Anode," and WO 2018/051675 to Takuya et al. entitled "Lithium Secondary Battery," both of which are incorporated herein by reference. Fluorinated electrolytes are available from Daikin America, Inc.

Applicant has recently developed improved electrolytes for silicon based batteries. These improved electrolytes are described in copending U.S. patent application Ser. No. 16/556,670 to Dong et al. (hereinafter the '670 application), entitled "Lithium Ion Cells With High Performance Electrolyte and Silicon Oxide Active Materials Achieving Very Long Cycling Performance," incorporated herein by reference. The new electrolyte formulations use significant amounts of fluoroethylene carbonate solvent and exclude other unstable components and appropriately select the other solvent components to provide the achieved stabilities.

The electrodes described herein can be assembled into various commercial cell/battery designs such as prismatic shaped batteries, wound cylindrical cells, coin cells, or other reasonable cell/battery designs, although the Examples are directed to coin cells. The cells can comprise a single pair of electrodes or a plurality of pairs of electrodes assembled in parallel and/or series electrical connection(s). Electrode stacks can have an extra electrode to end the stack with the same polarity as the other end of the stack for convenience in placement in a container. While the electrode structures described herein can be used in batteries for primary, or single charge use, the resulting batteries generally have desirable cycling properties for secondary battery use over multiple cycling of the batteries.

In some embodiments, the positive electrode and negative electrode can be stacked with the separator between them, and the resulting stacked structure can be rolled into a cylindrical or prismatic configuration to form the cell structure. Appropriate electrically conductive tabs can be welded or the like to the current collectors, and the resulting jellyroll structure can be placed into a metal canister or polymer package, with the negative tab and positive tab welded to appropriate external contacts. Electrolyte is added to the canister, and the canister is sealed to complete the cell. Some presently used rechargeable commercial cells include, for example, the cylindrical 18650 cells (18 mm in diameter and 65 mm long) and 26700 cells (26 mm in diameter and 70 mm long), although other cell/battery sizes can be used, as well as prismatic cells and foil pouch cells/batteries of selected sizes.

Pouch batteries can be particularly desirable for various applications, including certain vehicle applications, due to stacking convenience and relatively low container weight. A pouch battery design for vehicle batteries incorporating a high capacity cathode active material is described further in U.S. Pat. No. 8,187,752 to Buckley et al, entitled "High Energy Lithium Ion Secondary Batteries" and U.S. Pat. No. 9,083,062B2 to Kumar et al., entitled "Battery Packs for Vehicles and High Capacity Pouch Secondary Batteries for Incorporation into Compact Battery Packs," both incorporated herein by reference. While the pouch battery designs are particularly convenient for use in specific battery pack designs, the pouch batteries can be used effectively in other contexts as well with high capacity in a convenient format. Desirable results are presented in the examples with a prismatic shaped pouch battery with electrode stacks.

Figure 3:
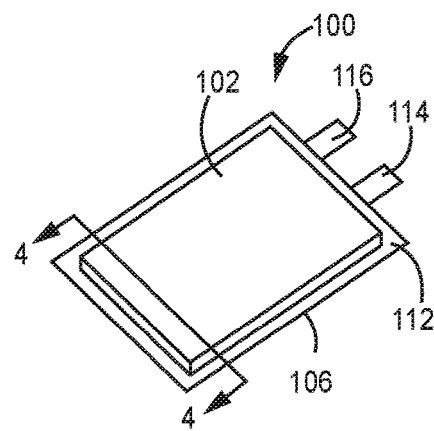
FIG. 3 is a perspective lower face view of the assembled pouch cell of FIG. 2.
Figure 4:
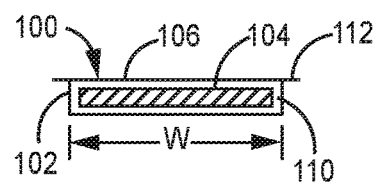
FIG. 4 is a bottom plan view of the pouch cell of FIG. 3.

A representative embodiment of a pouch battery is shown in FIGS. 2 to 5. In this embodiment, pouch battery 100 comprises pouch enclosure 102, electrode core 104 and pouch cover 106. An electrode core is discussed further below. Pouch enclosure 102 comprises a cavity 110 and edge 112 surrounding the cavity. Cavity 110 has dimensions such that electrode core 104 can fit within cavity 110. Pouch cover 106 can be sealed around edge 112 to seal electrode core 104 within the sealed battery, as shown in FIGS. 3 and 4. Terminal tabs 114, 116 extend outward from the sealed pouch for electrical contact with electrode core 104. FIG. 4 is a schematic diagram of a cross section of the battery of FIG. 3 viewed along the 4-4 line. Many additional embodiments of pouch batteries are possible with different configurations of the edges and seals.

Figure 5:
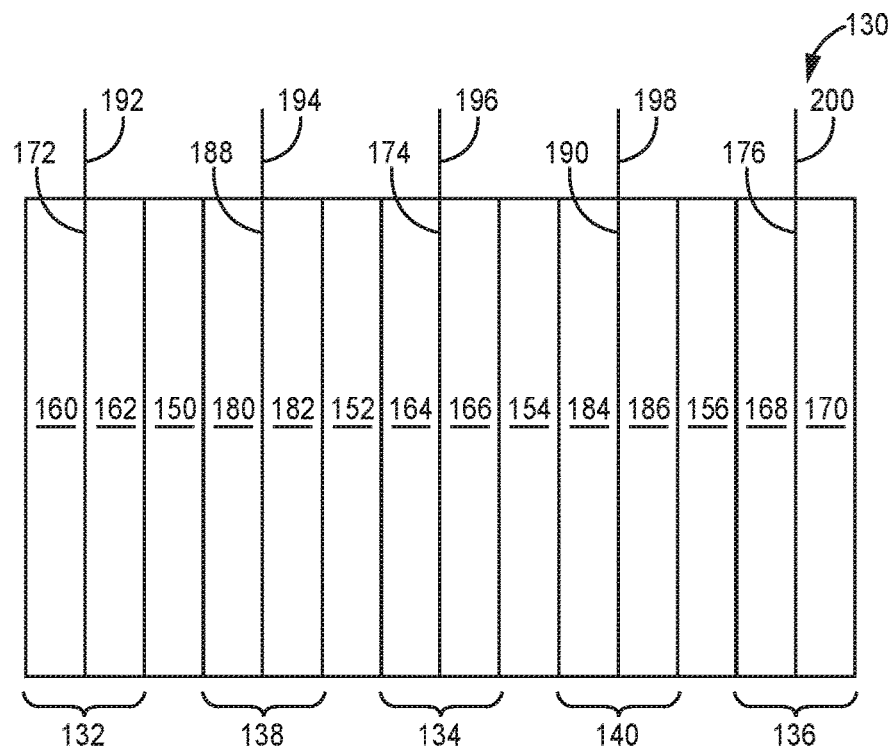
FIG. 5 is depiction of an embodiment of a core comprising an electrode stack.

FIG. 5 shows an embodiment of an electrode core 104 that generally comprise an electrode stack. In this embodiment, electrode stack 130 comprises negative electrode structures 132, 134, 136, positive electrode structures 138, 140, and separators 150, 152, 154, 156 disposed between the adjacent positive and negative electrodes. The separator can be provided as a single folded sheet with the electrode structures placed in the separator folds. Negative electrode structures 132, 134, 136 comprise negative electrodes 160, 162, negative electrodes 164, 166 and negative electrodes 168, 170, respectively, disposed on either side of current collectors 172, 174, 176. Positive electrode structures 138, 140 comprise positive electrodes 180, 182 and positive electrodes 184, 186, respectively, disposed on opposite sides of current collectors 188, 190, respectively. Tabs 192, 194, 196, 198, 200 are connected to current collectors 172, 188, 174, 190, 176, respectively, to facilitate the connection of the individual electrodes in series or in parallel. For vehicle applications, tabs are generally connected in parallel, so that tabs 192, 196, 200 would be electrically connected to an electrical contact accessible outside the container, and tabs 194, 198 would be electrically connected to an electrical contact as an opposite pole accessible outside the container.

As noted above, wound electrodes can be correspondingly used for either a cylindrical battery or a roughly prismatic shaped battery. Wound cells for cylindrical lithium ion batteries are described further in U.S. Pat. No. 8,277,969 to Kobayashi et al., entitled "Lithium Ion Secondary Battery," incorporated herein by reference. Prismatic shaped batteries with wound electrodes are described in U.S. Pat. No. 7,700,221 to Yeo (the '221 patent), entitled "Electrode Assembly and Lithium Ion Secondary Battery Using the Same," incorporated herein by reference. The Kobayashi '969 patent and the Yeo '221 patent do not describe how to achieve reasonable cycling or a high energy density with silicon based active materials. Designs for prismatic shaped batteries with wound electrodes are described further, for example, in the '221 patent cited above. A particular design of either a stacked set of electrodes or a wound cell can be influenced by the target dimensions and the target capacity of the battery.

The improved negative electrodes can be used for a range of applications and cell/battery designs. For electrode stacks, the areas of the electrodes can be selected reasonably based on the volume and design constraints for the particular application. Larger cells are generally designed for vehicle applications, such as drones, automobiles, trucks, or other vehicles. However, the improved negative electrodes described herein can be effectively used for consumer electronics applications, which can be based on smaller cell formats. Also, it should be noted that vehicles can use smaller consumer electronics cells, and Tesla cars presently are famous for using thousands of small consumer electronics cells in their battery packs.

Performance Properties

The combination of design features described herein can provide longer cycling stability while maintaining desirable battery performance. The achievement of the long term cycling involves use of the improved electrode binders described above along with the balance of cell design parameters. In embodiments of particular interest, the positive electrodes herein generally comprise a nickel rich-lithium nickel manganese cobalt oxide or lithium cobalt oxide, although other commercial cathode materials are also suitable.

The negative electrodes can be tested with a lithium foil electrode in a half cell configuration to evaluate its performance independent of the positive electrode features. Specifically, the negative electrode can be cycled against lithium metal over a voltage range of 0.005V to 1.5V at a selected rate. The improved negative electrodes herein cycle better in the half cell configurations relative to reference electrodes, but improved cycling stability if quantified more explicitly in the full cell configurations below.

The selected charge voltage can be influenced by the positive electrode active material. Generally, the selected charge voltage for these cells is from about 4.05V to 4.4V, and exemplified values include 4.3V. The batteries can exhibit very good cycling performance. In some embodiments, the batteries can exhibit a discharge capacity at cycle 700 of at least about 75% of the 6th cycle capacity discharged at 1C rate from the selected charge voltage to 2.5V at room temperature, in other embodiments at least about 80% and in additional embodiments at least about 82% at the 700th cycle relative to the 6th cycle discharge capacity when cycled from the selected charge voltage to 2.5V at 1C rate at room temperature. Similarly, the batteries can exhibit a discharge capacity at cycle 825 of at least about 75% of the 6th cycle capacity discharged at 1C rate from the selected charge voltage to 2.5V at room temperature, in other embodiments at least about 80% and in additional embodiments at least about 82.5% at the 825th cycle relative to the 6th cycle discharge capacity when cycled from the selected charge voltage to 2.5V at a rate of 1C rate at room temperature. A person of ordinary skill in the art will recognize that additional ranges within the explicit ranges above are contemplated and are within the present disclosure.

EXAMPLES

Example 1—Different Binder Systems

This example demonstrates the mechanical performance of electrode structures through the use of an appropriate polymer binder.

To evaluate the mechanical properties of electrodes with selected polymer binders, copper foil samples were laminated with electrodes having the different polymer binder systems. The polymer binder systems were mixtures of a polymer binder, electrically conductive carbon nanoparticles, and an active composition. To form the binder system test samples, each polymer binder was mixed with water or N-methyl-pyrrolidone ("NMP") (Sigma-Aldrich), as shown in Table 1, and stirred overnight to form a set of polymer binder solutions. Separately, a powder of a commercial silicon oxide/silicon/carbon composite material (referred to below as $SiO_x/Si/C$) and a selected amount of graphite were mixed thoroughly with a nanoscale carbon electrically conductive additive to form a homogeneous powder mixture. Homogenous powder mixture was then added to each polymer binder solution and mixed for about 2 hours to form homogeneous slurries. Each slurry was applied onto a copper foil to form a thin, wet film and the laminated copper foil was dried in a vacuum oven to remove solvent, either water or NMP, and to cure the polymer. The laminated copper foil samples were then pressed between rollers of a sheet mill to obtain a desired lamination thickness. The negative electrodes compositions were the same except for the binders, and these comprised 80 wt % to 90 wt % active material with the remainder being nanoscale conductive carbon and polymer binder. The active composition comprised from 55 wt % to 85 wt % silicon oxide based composite and the remainder graphite. Once formed, the anode is dried under vacuum at a temperature in the range of 100 to 150° C. for several hours. The same electrode compositions were used for all of the examples.

Figure 6:
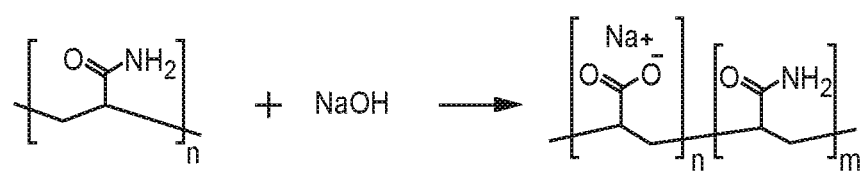
FIG. 6 shows the reaction used to prepare poly(acrylamide-co-sodium acrylate) copolymers.

Fifteen samples with different binder polymers were formed. Table 1 summarizes the compositions of the polymer binders tested and the solvents used in the preparation of the laminated copper test samples. Binders 1-15 were used to prepare Samples 1-15. The polyacrylamide copolymers (Samples 8 and 12-15) were prepared by mixing polyacrylamide (400,000 to 800,000 MW, PolySciences Inc., USA) with concentrated NaOH (Sigma-Aldrich, USA) for between 2 hours and 1 week. The protocol roughly followed the procedures in the Klein et al., "Preparation and Characterization of Poly(acrylamide-co-acrylic acid), Makromo. Chem. Vol. 179, 1978, pp. 1895-1904) reference cited above. The reaction time was controlled to achieve a copolymer with the desired ratio of monomer units. The reaction was ended by quenching with methanol (ACS grade, VWR, USA). The polymer product was redissolved in water and the pH adjusted to 7 with the addition of HCl (1M ACS grade, VWR, USA) to neutralize excess sodium hydroxide. Sodium chloride was removed by quenching with additional methanol (ACS grade, VWR, USA) and the copolymer was redissolved in water. The final ratio of PAM to NaPAA in the copolymers is defined by a letter where A>B>C>D>E>F>G where A is a ratio of 100:0 and G is a ratio of 0:100. FIG. 6 outlines the synthesis of the polyacrylamide copolymers.

TABLE 1

| Binder | Binder Composition | MW Range of Polyacrylate | Solvent |
|---|---|---|---|
| 1 | Polyimide | | NMP |
| 2 | Sodium Carboxymethyl cellulose/Styrene butyl rubber | | Water |
| 3 | Lithium polyacrylate | | Water |
| 4 | Lithium polyacrylate/Polyimide (75%:25%) | 300K-500K | Water |
| 5 | Sodium polyacrylate (Ratio G) | | Water |
| 6 | Sodium polyacrylate/Polyimide (75%:25%) | 300K-500K | Water |
| 7 | Polyacrylamide (Ratio A) | | Water |
| 8 | Poly(acrylamide-co-sodium acrylate) (Ratio E) | | Water |
| 9 | Sodium polyacrylate/Polyimide (75%:25%) | 900K-1400K | Water |
| 10 | Lithium polyacrylate/Polyimide (75%:25%) | 100K-300K | Water |
| 11 | Sodium polyacrylate/Polyimide (75%:25%) | 100K-300K | Water |
| 12 | Poly(acrylamide-co-sodium acrylate) (Ratio B) | | Water |
| 13 | Poly(acrylamide-co-sodium acrylate) (Ratio C) | | Water |
| 14 | Poly(acrylamide-co-sodium acrylate) (Ratio D) | | Water |
| 15 | Poly(acrylamide-co-sodium acrylate) (Ratio F) | | Water |

Adhesion (Adhesive Strength)

Figure 7:
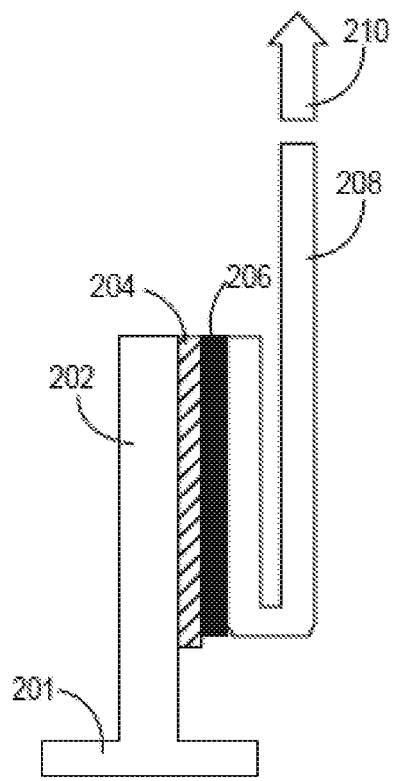
FIG. 7 is a schematic representation of the 180-degree adhesion peel test set-up.

The electrode structure test samples were tested for the adhesive strength of the electrode to the copper foil. Adhesive strength was measured using a 180-degree peel adhesion test. The adhesion force was measured and plotted as a function of the peel distance in millimeters. The test set-up is schematically represented in FIG. 7. An Ametek Chatillon TCD225 Series force measurement instrument was used. A 70×25 mm section of double-sided tape 104 (7139a16 from McMaster-Carr, USA) was adhered to a glass plate 102. The glass plate 102 was fixed to the lower clamp 100 of the force measurement instrument. The electrode structure consisted of electrode 106 and copper foil 108. The electrode 106 (150×30 mm) was compressed, face down on the double-sided tape 104. The copper foil 108 (~220×30 mm) was connected to the other side of the force measurement instrument 110. The copper foil was pulled at a rate of 2 mm per minute for 20 mm. The peel force was measured in pound-force (lbf). The peel forces can be normalized according to the width of the tape to yield units of pound-force/meter (lbf/m).

It is noted that the samples were tested until the electrode structure delaminated from the copper foil current collector. Upon delamination, a visual analysis showed that little if any electrode material remained on the copper foil, which indicates that the cohesive strength is generally greater than the adhesive strength. Upon delamination, the peel force became approximately constant, and this normalized value is used as the adhesion force.

Figure 8:
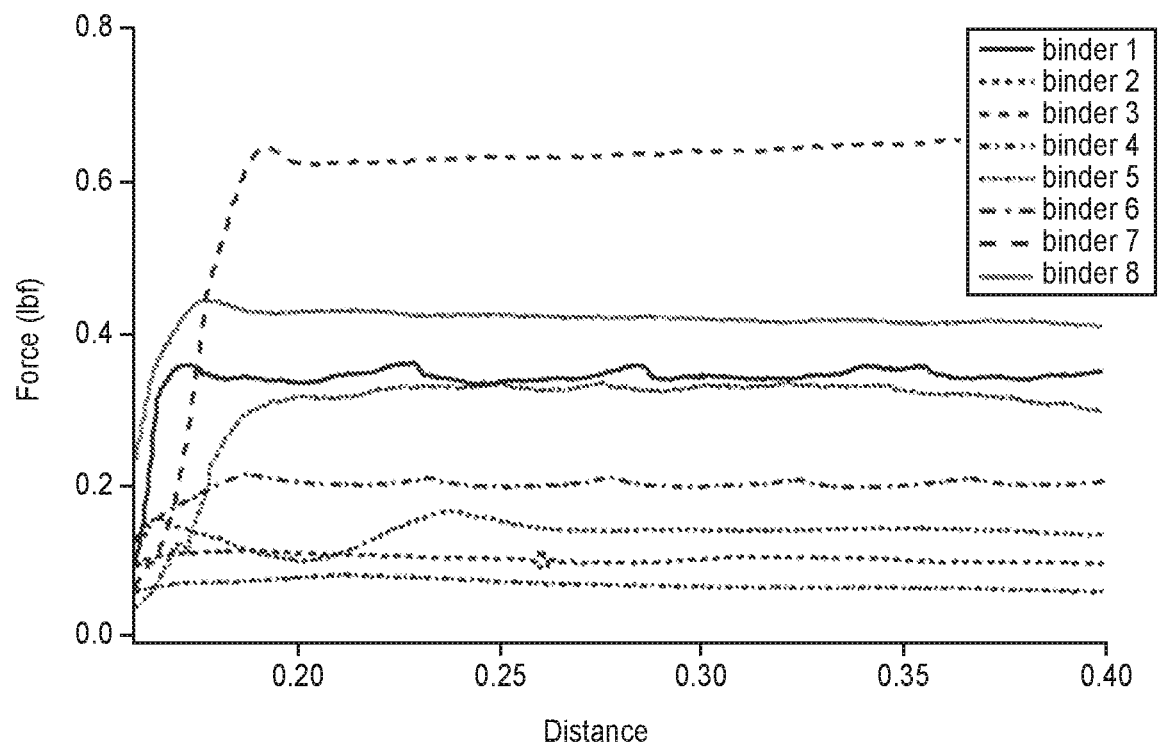
FIG. 8 is a plot of the adhesive force as a function of peel distance for copper foil samples laminated with electrodes formed with eight polymer binder compositions.

FIG. 8 shows the results (un-normalized) of testing Samples 1-8. The normalized values can be obtained by dividing the plotted numbers by 0.025 meters (25 mm). Sample 7 (polyacrylamide) had the highest adhesive strength, followed by Sample 8 (poly(acrylamide-co-sodium acrylate)). Both Samples 7 and 8 had adhesive strengths to the copper foil greater than Sample 1 (polyimide). Sodium polyacylate (Sample 5) showed better adhesive strength than lithium polyacrylate (Sample 3). A blend of sodium polyacrylate and polyimide (Sample 6) showed lower adhesive strength than both the polyimide binder (Sample 1) and the sodium polyacrylate binder (Sample 5).

Figure 9:
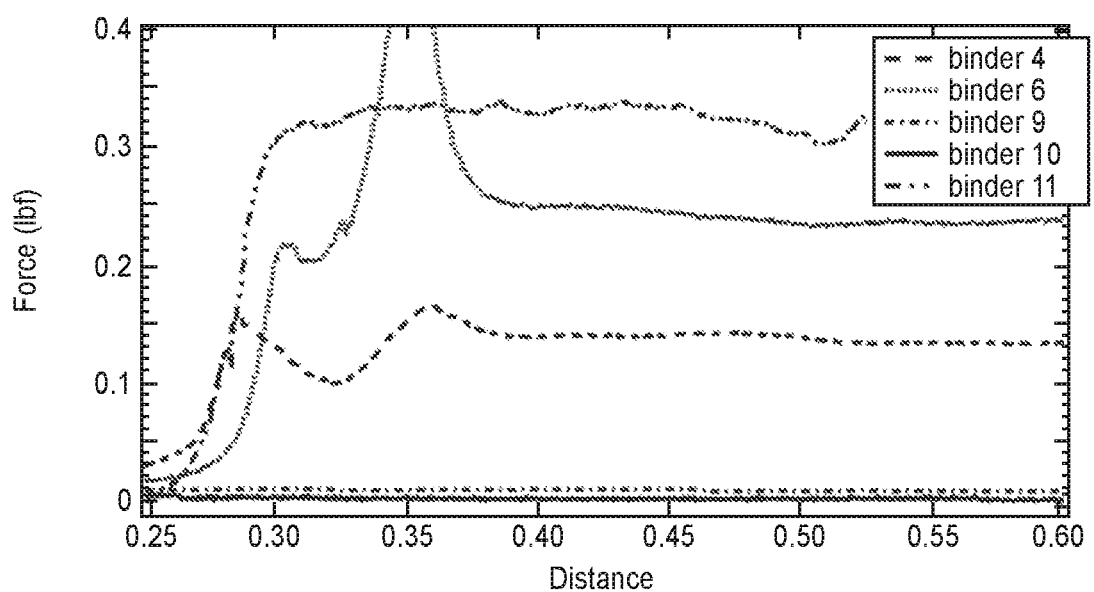
FIG. 9 is a plot of the adhesive force as a function of peel distance for copper foil samples laminated with electrodes formed with sodium polyacrylate/polyimide blend and lithium polyacrylate/polyimide blend binder compositions with varied polyacrylate molecular weights.

FIG. 9 shows the results (un-normalized) of testing additional sodium polyacrylate/polyimide blend and lithium polyacrylate/polyimide blend binder compositions with varied polyacrylate molecular weights (Samples 4, 6 and 9-11). Sample 9 had the highest adhesion followed by Samples 6 and 4. Samples 10 and 11, with lower molecular weights, showed negligible adhesion. Comparing FIG. 9 to FIG. 8, the results surprisingly show that certain blends of sodium polyacrylate or lithium polyacrylate with polyimide have lower adhesion to copper than lithium polyacrylate (Sample 3) or sodium polyacrylate (Sample 5). In particular, the poor adhesion of Samples 10 and 11 was a surprising result given the relatively good adhesion of polyimide (Sample 1), lithium polyacrylate (Sample 3), and sodium polyacrylate (Sample 5) (non-blended) binders. In general, the sodium polyacrylate/polyimide blends showed similar adhesive strength as sodium polyacrylate (FIG. 8) and higher adhesion than the lithium polyacrylate/polyimide blends.

Figure 10:
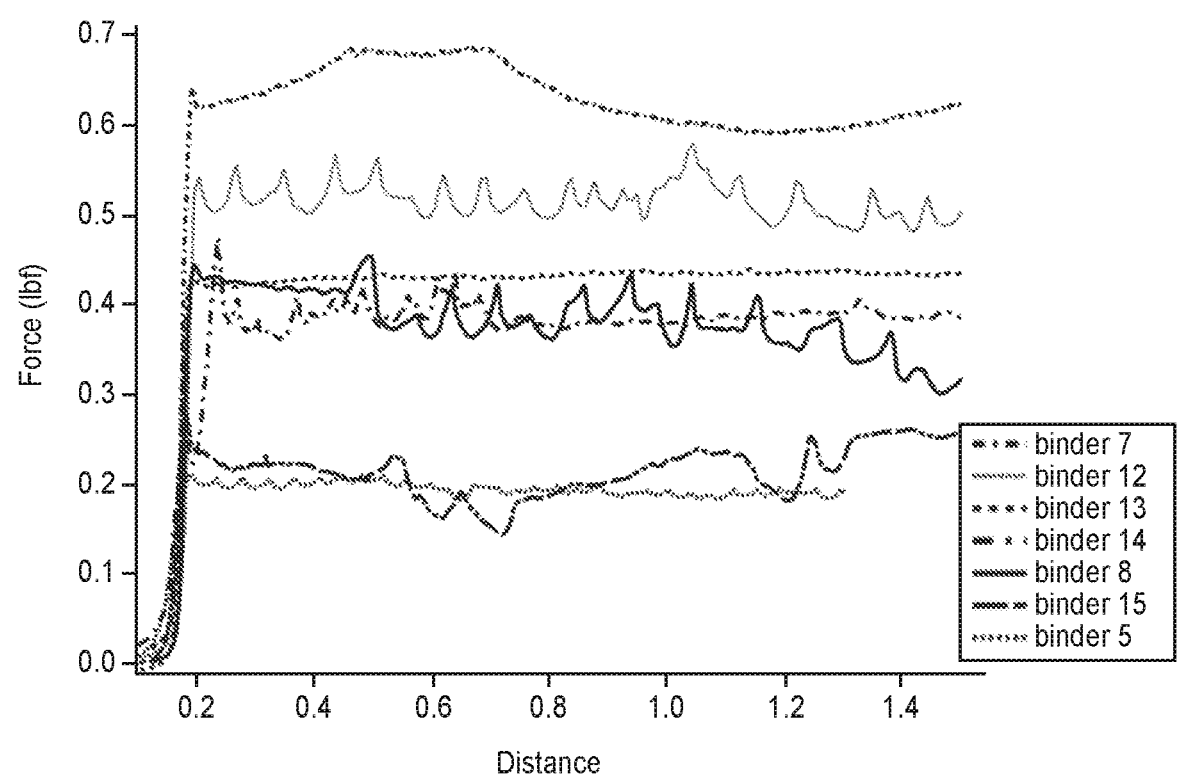
FIG. 10 is a plot of the adhesive force as a function of peel distance for copper foil samples laminated with electrodes formed with poly(acrylamide-co-sodium acrylate) binder compositions with varied weight percent of each monomer unit and electrodes formed with comparative binder compositions.

FIG. 10 shows the results (un-normalized) of testing additional poly(acrylamide-co-sodium acrylate) compositions with varied weight percent of each monomer unit (Samples 12-15) and provides a comparison with Sample 5 (sodium polyacrylate), Sample 7 (polyacrylamide), and the poly(acrylamide-co-sodium polyacrylate) composition of Sample 8. FIG. 10 also shows that the adhesive strength of the poly(acrylamide-co-sodium polyacrylate samples) depends on the composition of the copolymer. Overall, the results of the fifteen samples tested showed that polyacrylamide and certain polyacrylamide-based copolymer binders had the highest adhesion performance. The results demonstrate that both the polyacrylamide binders and the polyacrylamide-based copolymer binders can provide high adhesion to a copper foil current collector.

Cohesive Strength

Figure 11:
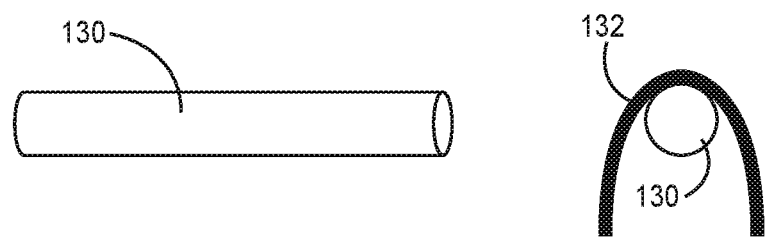
FIG. 11 is a schematic representation of the mandrel test.

The electrode structure test samples were also tested for flexibility. A testing protocol essentially as described in ASTM D522/D522M-17 Standard Test Method for Mandrel Bend Test of Attached Organic Coatings was used with minor modifications. In this test, as schematically shown in FIG. 11, each electrode structure sample 132 was subjected to a 180 degree bend upon mandrels 130 of increasingly smaller diameter until the coating fails due to formation of cracks with a smallest diameter mandrel being 2 mm. Table 2 shows the mandrel diameter at which each sample showed failure. Smaller values of the mandrel diameter at failure correlate with higher flexibility of the polymer binder coated onto the copper or increased electrode flexibility. Increased flexibility of the electrode correlates with an increase in the cohesion the polymer binder system.

TABLE 2

| Sample | Mandrel Diameter at Failure |
| --- | --- |
| 1 | 6 mm |
| 2 | <2 mm |
| 3 | <2 mm |
| 4 | >20 mm |
| 5 | <2 mm |
| 6 | 10 mm |
| 7 | 10 mm |
| 8 | 3 mm |
| 9 | 3 mm |
| 10 | <2 mm |
| 11 | <2 mm |
| 12 | 6 mm |
| 13 | 3 mm |
| 14 | 2 mm |
| 15 | <2 mm |

Four poly(acrylamide-co-sodium acrylate) binder systems showed good flexibility, failing at 3 mm (Samples 8 and 13), 2 mm (Sample 14), and less than 2 mm (Sample 15). This flexibility performance is indicative of good particle cohesions within the binder systems. An additional poly(acrylamide-co-sodium acrylate) binder system (Sample 12) showed less flexibility, failing at 6 mm. Samples 8 and 13-15 were more flexible than the polyimide binder system (Sample 1) and the polyacrylamide binder system (Sample 7). Samples 8 and 13 showed similar flexibility to the sodium carboxymethyl cellulose/styrene butyl rubber (Sample 2), lithium polyacrylate (Sample 3), and sodium polyacrylate (Sample 5) binder systems.

Three metal polyacrylate/polyimide blend binder systems showed good flexibility, failing at 3 mm (Sample 9, sodium-based) and less than 2 mm (Samples 10 and 11, lithium and sodium-based, respectively). Sample 9 (polyacrylate molecular weight range of 900K-1400K) and Samples 10-11 (polyacrylate molecular weight range of 100K-300K) showed similar flexibility to the lithium-polyacrylate binder system (Sample 3), the sodium-polyacrylate binder system (Sample 5), and the sodium carboxymethyl cellulose/styrene butyl rubber binder system (Sample 2). Samples 9-11 showed higher flexibility than the polyimide binder system (Sample 1). Two additional metal polyacrylate/polyimide blend binder systems showed relatively poor flexibility. Sample 6 (sodium-based) failed at 10 mm. Sample 4 (lithium-based) failed at more than 20 mm, the lowest flexibility of the samples tested. Both Sample 6 and Sample 4 had a polyacrylate molecular weight range of 300K-500K. The metal-polyacrylate/polyimide blend results indicate a correlation between the molecular weight of the metal-polyacrylate component and flexibility.

Sample 8 showed a combination of high adhesive strength to the copper foil, good flexibility, and good particle cohesion. Among the metal-polyacryate/polyimide blend binder systems, Sample 9 showed a good combination of adhesive strength, flexibility, and particle cohesion.

Example 2—Binder System Performance in Half Coin Cells

This Example demonstrates the impact of binder molecular weight and binder copolymer composition on cycling performance for silicon based electrodes using lithium polyacrylate/polyimide blend and sodium polyacrylate/polyimide blend binder formulations.

Twelve coin cells were formed to test binder system compositions corresponding to Binders 4-15 as shown in Table 1. The coin cells were formed with an anode prepared as described above.

Coin cells were formed using a lithium foil counter electrode, referred to as a half cell. A section of negative electrode was cut to size along with separator, a section of lithium foil and corresponding current collector for the lithium foil. The separator for the coin cells described herein comprises a commercial tri-layer polyolefin separator. An electrolyte comprising dimethyl carbonate and fluoroethylenecarbonate was placed in the cell and the cell was sealed. The coin cells were then cycled from 0.005V to 1.5V in a battery for a first cycle charge and discharge of C/10 rate, a second cycle charge and discharge rate of C/5 rate, and the remaining cycles at a charge and discharge rate of C/3.

Figure 12:
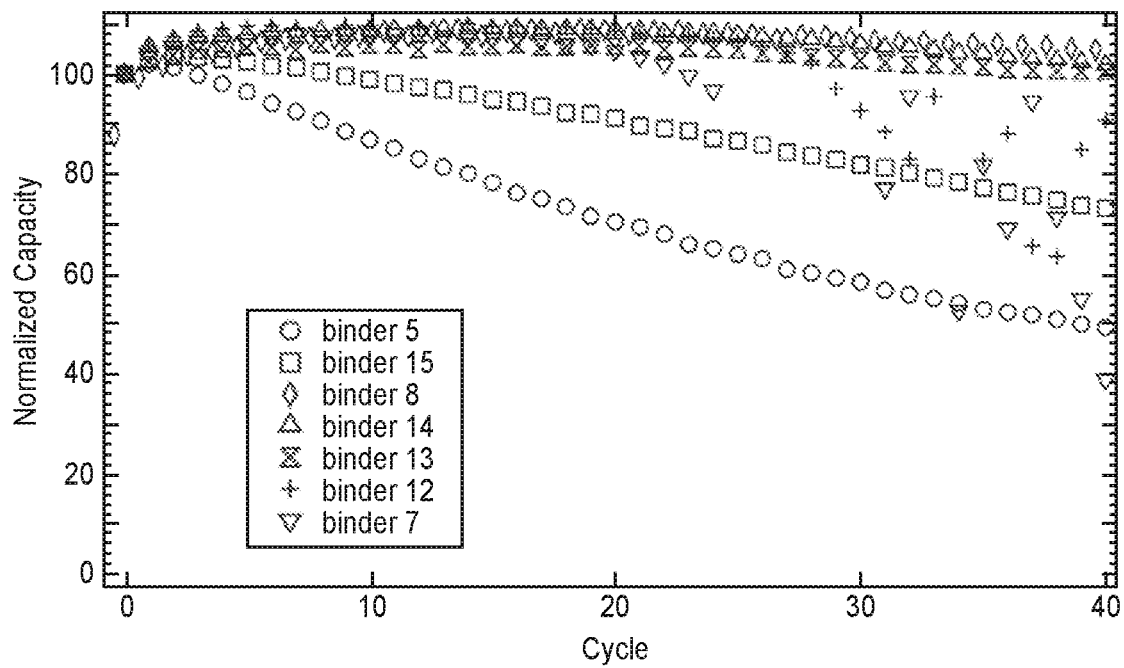
FIG. 12 is a plot of normalized capacity as a function of cycle number for half coin cells having SiOx anodes formed with poly(acrylamide-co-sodium acrylate) binders with different ratios of each monomer unit (from 100:0 to 0:100).

FIG. 12 compares the capacity versus cycle number for cells with poly(acrylamide-co-sodium acrylate) binders (Binders 8 and 12-15) to cells with sodium polyacrylate binder (Binder 5) and polyacrylate binder (Binder 7). Binders 8 and 12-15 have the same molecular weight range but different relative amount of each monomer unit in the copolymer. Copolymer Binders 8, 14, and 13 showed the best cycling performance. Copolymer Binder 15 showed poorer cycling performance, but the performance of Binder 15 was superior to that of sodium polyacrylate (Binder 5) and more stable than that of polyacrylate (Binder 7). The data shows that good cycling performance can be achieved with the copolymer binders, but also shows that the cycle life depends on the relative amounts of the monomer units in the copolymer. The best cycling life corresponded to the intermediate amide to acrylate ratios E (Binder 8), D (Binder 14), and C (Binder 13).

Figure 13:
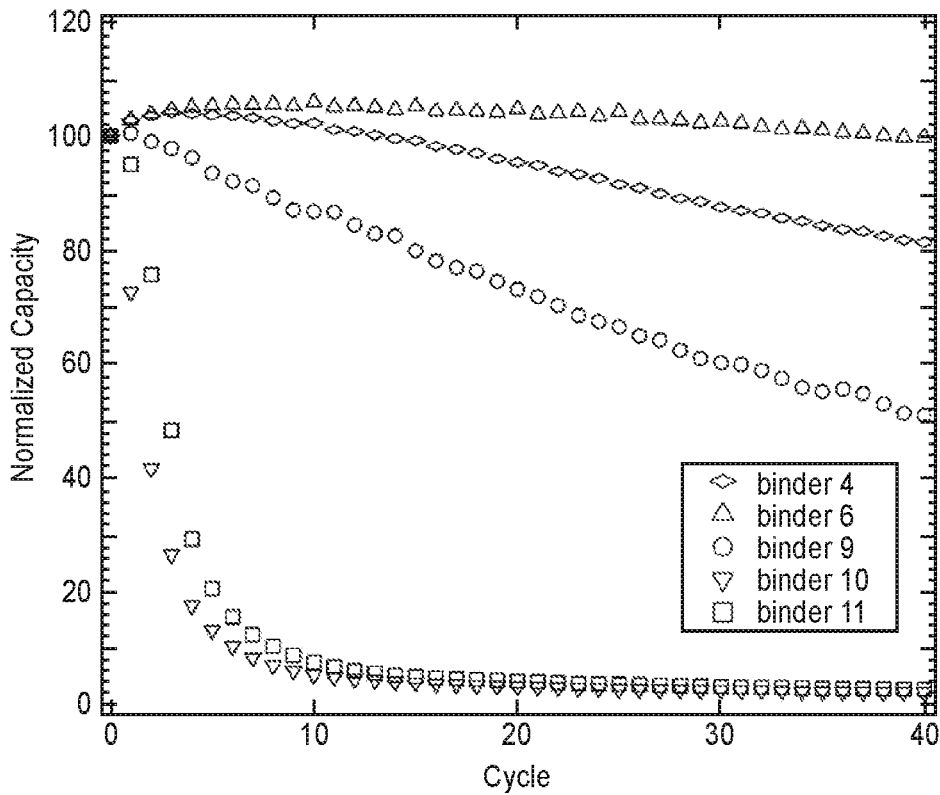
FIG. 13 is a plot of normalized capacity as a function of cycle number for half coin cells having SiOx anodes formed with sodium polyacrylate/polyimide blend and lithium polyacrylate/polyimide blend binder compositions with varied polyacrylate molecular weights.

Normalized capacity as a function of cycle number is plotted in FIG. 13 for both charge and discharge. The results show the impact of binder molecular weight on the half cell cycling. Binder 6 (300K-500K) had the best cycling performance, showing good cycling stability at 40 cycles. Binder 4 (300K-500K) retained 80% capacity at 40 cycles. Binder 9 (900K-1400K) retained only about 50% capacity at 40 cycles. Binders 10 and 11 (100K-300K) showed poor cycling performance. The results indicate that a binder with a molecular weight that is too low or too high can negatively impact cycling performance. The results also showed that the sodium polyacrylate/polyimide blend (Binder 6) cycled slightly better than the lithium polyacrylate/polyimide blend (Binder 4) at an equivalent molecular weight range.

Example 3—Binder System Performance in Full Coin Cells

This Example demonstrates improved cycling performance for silicon based electrodes using a polyacrylamide-based copolymer binder formulations.

Nine sets of coin cells were formed to test binder system compositions corresponding to Binders 1-8 and 12 as shown in Table 1. The coin cells were formed with an anode prepared as described above in Example 2. Once prepared, the negative electrodes were electrochemically pre-lithiated with sufficient lithium to compensate for 100% to 160% of the loss of lithium due to the anode irreversible capacity loss. These full cells are referenced according to their anode binder compositions.

The cathode was formed with a nickel rich-lithium nickel manganese cobalt oxide (N-NMC622). The positive electrode had a loading of active material from about 93 wt % to 97.5 wt % blended with 1 wt % to 4 wt % pvdf binder, and 1 wt % to 3 wt % nanoscale carbon. The cathode material was blended with NMP solvent, spread onto an aluminum foil current collector, pressed, and dried. To form the coin cells, a section of negative electrode was cut to size along with separator, and a section of positive electrode was also cut to size. The electrodes with the separator between them was placed in a coin cell enclosure. The separator for the coin cells described herein comprises a commercial tri-layer polyolefin separator. An electrolyte comprising dimethyl carbonate and fluoroethylenecarbonate was placed in the cell and the cell was sealed. The electrolytes were selected according to the teachings of the '670 application cited above.

Figure 14:
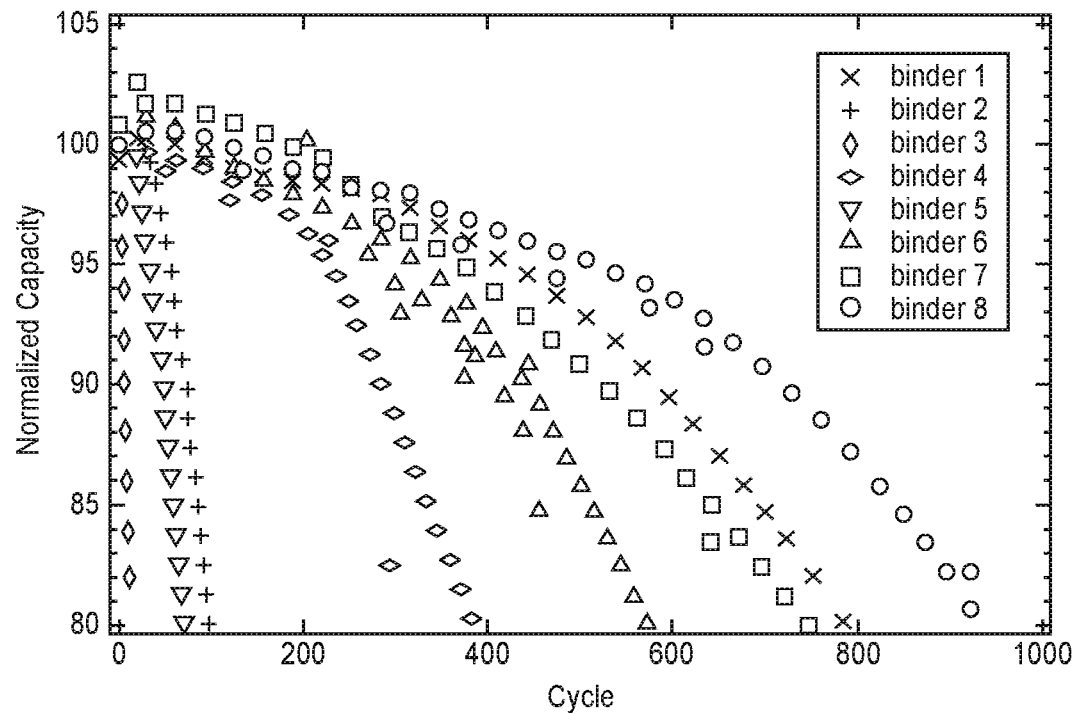
FIG. 14 is a plot of normalized capacity as a function of cycle number for full coin cells having SiOx anodes formed with eight polymer binder compositions.

The assembled cells were cycled between 4.3V and 2.5V at a cycling rate of 1C for charging and 1C for discharging. The cells were previously cycled by a rate protocol prior to 1C cycling which involved two sets of charge/discharge rates of C/10, C/5, C/3, 1C cycling. The cycling results for normalized capacity are plotted in FIG. 14. The polyimide (Binder 1) showed approximately 80% capacity retention at 800 cycles at a cycling rate of 1C. The cells with common binders such as carboxyl-methylcellulose/SBR (Binder 2), lithium polyacrylic acid (Binder 3), and sodium polyacrylic acid (Binder 5) cycle for less than 200 cycles. The polyacrylamide (Binder 7) cycled at approximately 750 cycles. Poly(acrylamide-co-sodium acrylate) (Binder 8) showed the best cycling performance. Binder 8 cycled at 925 cycles with approximately 600 cycles above 95% capacity.

Figure 15:
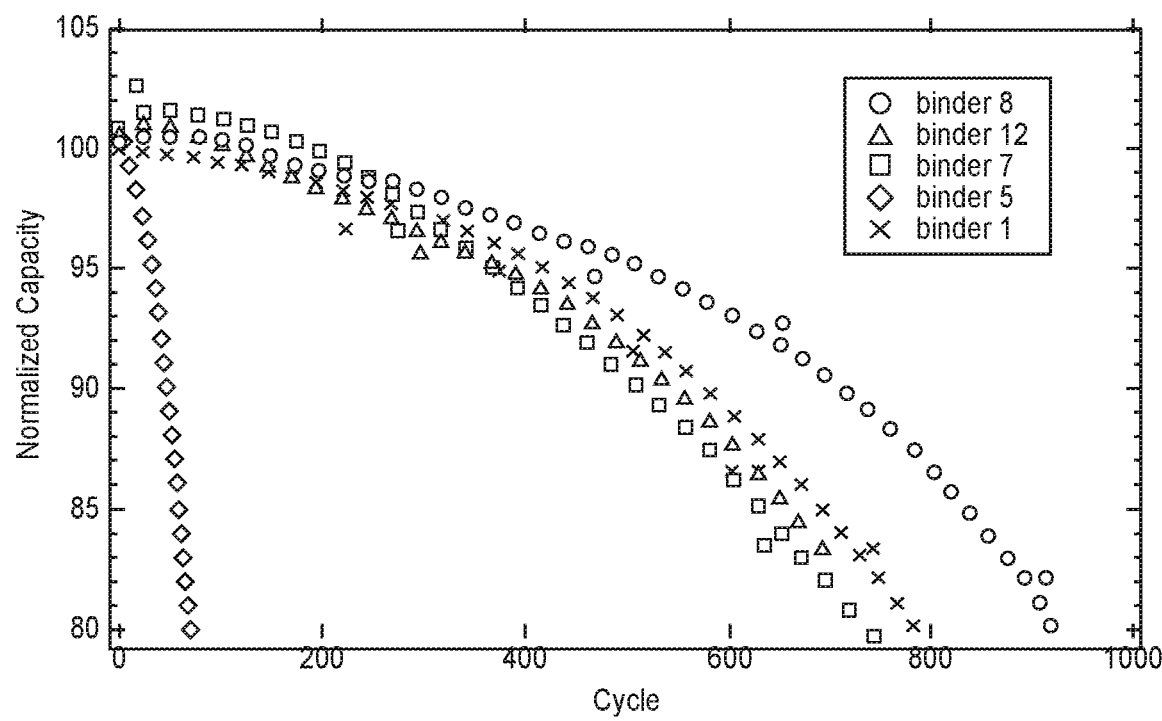
FIG. 15 is a plot of normalized capacity as a function of cycle number for full coin cells having SiOx anodes formed with poly(acrylamide-co-sodium acrylate) binders and electrodes formed with comparative binder compositions.

FIG. 15 presents the capacity versus cycle number for cells with binders having different ratios of polyacrylamide to sodium acrylate moieties. Specifically, FIG. 15 compares cells with Binder 5 (Ratio G), Binder 7 (Ratio A), copolymer Binder 8 (Ratio E), and copolymer Binder 12 (Ratio B) with polyimide (Binder 1). Copolymer Binder 8 provided approximately 850 cycles above 85% capacity. The polyimide (Binder 1) had about 700 cycles above 85% capacity. Binder 7 and copolymer Binder 12 had approximately 650 cycles above 85% capacity. The sodium polyacrylate (Binder 5) showed significantly poorer cycling performance than the water-based poly(acrylamide-co-metal acrylate) binders (Binders 8 and 12). The cycle life was higher for the copolymer binder with the lower ratio of polyacrylamide to sodium acrylate.

In summary, the water-based poly(acrylamide-co-acrylate salt) polymer anode binders were able to provide good adhesive properties and excellent cohesive properties, exceeding that of polyimide and polyacrylamide, while providing improved cycle life as compared to polyimide, sodium polyacrylate, and polyacrylamide and improved cycling stability as compared to polyacrylamide. The initial data shows that the co-polymer binders provide a better combination of performance properties as compared to metal-polyacrylate/polyimide blend binders.

The embodiments above are intended to be illustrative and not limiting. Additional embodiments are within the claims. In addition, although the present invention has been described with reference to particular embodiments, those skilled in the art will recognize that changes can be made in form and detail without departing from the spirit and scope of the invention. Any incorporation by reference of documents above is limited such that no subject matter is incorporated that is contrary to the explicit disclosure herein. To the extent that specific structures, compositions and/or processes are described herein with components, elements, ingredients or other partitions, it is to be understand that the disclosure herein covers the specific embodiments, embodiments comprising the specific components, elements, ingredients, other partitions or combinations thereof as well as embodiments consisting essentially of such specific components, ingredients or other partitions or combinations thereof that can include additional features that do not change the fundamental nature of the subject matter, as suggested in the discussion, unless otherwise specifically indicated.

What is claimed is:

1. A negative electrode for a lithium ion battery comprising:
    an active material comprising a silicon oxide-based active material;
    nanoscale conductive carbon; and
    a polymer binder consisting essentially of poly (acrylamide-co-acrylate salt) having at least about 5 mole percent of the acrylate salt moiety and at least about 5 mole percent of the acrylamide moiety
    wherein the negative electrode on a metal foil current collector has a 180 degree peel adhesion with a force of at least about 6 pound-force/meter and a cohesion corresponding to maintenance of electrode integrity when bent around a mandrel with a diameter of 6 mm.

2. The negative electrode of claim 1 wherein the active material further comprises graphite, and the active material comprises from about 20 wt % to about 100 wt % of the silicon oxide-based material and from about 0 wt % to about 80 wt % of the graphite.

3. The negative electrode of claim 1 wherein the silicon oxide-based active material comprises a composite comprising carbon, silicon suboxide and optionally nanoscale silicon.

4. The negative electrode of claim 1 wherein the silicon oxide-based active material comprises silicon suboxide.

5. The negative electrode of claim 1 wherein the nanoscale conductive carbon comprises carbon nanotubes, carbon black, carbon nanofibers, or mixtures thereof.

6. The negative electrode of claim 1 wherein the poly (acrylamide-co-acrylate salt) has a sodium, potassium, ammonium or a combination thereof as counter ion.

7. The negative electrode of claim 1 wherein the poly (acrylamide-co-acrylate salt) has a sodium counter ion and an average molecular weight from about 300,000 g/mole to about 2,000,000 g/mol.

8. The negative electrode of claim 1 having from about 78 wt % to about 96 wt % of the active material, from about 0.1 wt % to about 7 wt % of the nanoscale conductive carbon; and from about 4 wt % to about 20 wt % of the polymer binder, wherein the poly (acrylamide-co-acrylate salt) comprises poly (acrylamide-co-sodium acrylate).

9. A negative electrode structure comprising a metal foil current collector and the negative electrode of claim 1 on the current collector and having a 180 degree peel adhesion with a normalized load of at least about 6 lbf/m and a cohesion corresponding to maintenance of electrode integrity when bent around a mandrel with a diameter of 6 mm.

10. The negative electrode structure of claim 9 wherein the negative electrode has from about 78 wt % to about 96 wt % of the active material, from about 0.1 wt % to about 7 wt % of the nanoscale conductive carbon; and from about 4 wt % to about 20 wt % of the polymer binder, wherein the poly (acrylamide-co-acrylate salt) comprises poly (acrylamide-co-sodium acrylate).

11. A lithium ion cell comprising:
the negative electrode of claim 1;
a positive electrode structure comprising a current collector and on the current collector an electrode comprising a lithium metal oxide, conductive carbon, and a polymer binder;
a separator between the negative electrode structure and the positive electrode structure;
electrolyte comprising a lithium salt and non-aqueous solvent; and
a container enclosing the electrode structures, the separator and the electrolyte.

12. The lithium ion cell of claim 11
wherein the lithium ion cell has a capacity at the 700th cycle of at least about 80% of the capacity at the 5th cycle when cycled from the 10th cycle to the 700th cycle between 2.5V and the selected charge voltage at a rate of 1C.

13. The lithium ion cell of claim 11 wherein the negative electrode comprises from about 75 wt % to about 96 wt % of the active material, from about 0.1 wt % to about 7 wt % of the nanoscale conductive carbon and from about 4 wt % to about 20 wt % of the polymer binder.

14. The lithium ion cell of claim 11 wherein the poly (acrylamide-co-acrylate salt) has a sodium counter ion and an average molecular weight from about 300,000 g/mole to about 2,000,000 g/mol.

15. The lithium ion cell of claim 11 wherein the silicon oxide-based active material comprises a composite of carbon, silicon suboxide, and optionally nanoscale silicon.

16. The lithium ion cell of claim 11 wherein the lithium metal oxide comprises lithium cobalt oxide or nickel rich lithium nickel manganese cobalt oxide represented by the formula $LiNi_xMn_yCo_zO_2$, $0.45 \leq x$, $0.05 \leq y$, $z \leq 0.35$.

17. The lithium ion cell of claim 16 wherein the lithium metal oxide further comprises from about 20 wt % to about 80 wt % of (lithium+manganese) rich lithium metal oxide represented by the formula $Li_{1+b}Ni_\alpha Mn_\beta Co_\gamma A_\delta O_{2-z}F_z$, where $b+\alpha+\beta+\gamma+\delta \approx 1$, b ranges from about 0.04 to about 0.3, $\alpha$ ranges from 0 to about 0.4, $\beta$ range from about 0.2 to about 0.65, $\gamma$ ranges from 0 to about 0.46, $\delta$ ranges from about 0 to about 0.15 and z ranges from 0 to 0.2, with the proviso that both $\alpha$ and $\gamma$ are not 0, and where A is a metal different from lithium, manganese, nickel and cobalt.

18. The lithium ion cell of claim 11 wherein the lithium metal oxide comprises (lithium+manganese) rich lithium metal oxide represented by the formula $Li_{1+b}Ni_\alpha Mn_\beta Co_\gamma A_\delta O_{2-z}F_z$, where $b+\alpha+\beta+\gamma+\delta \approx 1$, b ranges from about 0.04 to about 0.3, $\alpha$ ranges from 0 to about 0.4, $\beta$ range from about 0.2 to about 0.65, $\gamma$ ranges from 0 to about 0.46, $\delta$ ranges from about 0 to about 0.15 and z ranges from 0 to 0.2, with the proviso that both $\alpha$ and $\gamma$ are not 0, and where A is a metal different from lithium, manganese, nickel and cobalt.

19. The lithium ion cell of claim 11 wherein the lithium ion cell has a capacity at the 825th cycle of at least about 80% of the capacity at the 5th cycle when cycled from the 10th cycle to the 825th cycle between 2.5V and the selected charge voltage at a rate of 1C.

20. A negative electrode for a lithium ion battery comprising:
an active material comprising a silicon oxide-based active material;
nanoscale conductive carbon; and
a polymer binder consisting of a polymer blend with at least about 75 wt % poly (acrylamide-co-acrylate salt) having at least about 15 mole percent of the acrylate salt moiety and at least about 25 mole percent of the acrylamide moiety,
wherein the negative electrode on a metal foil current collector has a 180 degree peel adhesion with a force of at least about 6 pound-force/meter and a cohesion corresponding to maintenance of electrode integrity when bent around a mandrel with a diameter of 6 mm.

21. The negative electrode of claim 20 wherein the polymer blend consists of the up to about 25 wt % polyimide.

22. The negative electrode of claim 20 wherein the polymer blend consists of the up to about 25 wt % polyacrylate.

23. The negative electrode of claim 20 wherein the polymer blend consists of the up to about 25 wt % polyacrylamide.

* * * * *